US007406043B1

(12) United States Patent
Chu et al.

(10) Patent No.: US 7,406,043 B1
(45) Date of Patent: *Jul. 29, 2008

(54) METHOD FOR PROVIDING VOICE-OVER-IP SERVICE

(75) Inventors: Yue-Chuan Chu, Convent Station, NJ (US); Ningming Hua, Rockaway, NJ (US); John F Murray, Denville, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,641

(22) Filed: Apr. 10, 2007

Related U.S. Application Data

(63) Continuation of application No. 11/260,163, filed on Oct. 28, 2005, now Pat. No. 7,203,166, which is a continuation of application No. 10/054,135, filed on Nov. 13, 2001, now Pat. No. 7,006,436.

(51) Int. Cl.
*G01R 31/08* (2006.01)
(52) U.S. Cl. .................. 370/230; 370/352; 370/401
(58) Field of Classification Search .............. None
See application file for complete search history.

(56) References Cited

U.S. PATENT DOCUMENTS

| 6,055,236 | A * | 4/2000 | Nessett et al. ............... 370/389 |
|---|---|---|---|
| 6,070,187 | A * | 5/2000 | Subramaniam et al. ...... 709/220 |
| 6,393,467 | B1 * | 5/2002 | Potvin ........................ 709/217 |
| 6,404,746 | B1 * | 6/2002 | Cave et al. ................... 370/262 |
| 6,512,818 | B1 * | 1/2003 | Donovan et al. ............. 370/352 |
| 6,594,269 | B1 * | 7/2003 | Polcyn ........................ 370/401 |
| 6,667,971 | B1 * | 12/2003 | Modarressi et al. ......... 370/352 |
| 7,006,436 | B1 * | 2/2006 | Chu et al. .................... 370/230 |
| 7,050,422 | B2 * | 5/2006 | Xu et al. ....................... 370/352 |
| 7,203,166 | B1 * | 4/2007 | Chu et al. .................... 370/230 |
| 7,286,521 | B1 * | 10/2007 | Jackson et al. .............. 370/352 |
| 2002/0052915 | A1 * | 5/2002 | Amin-Salehi ............... 709/203 |
| 2002/0106071 | A1 * | 8/2002 | Uppaluru et al. ........ 379/265.02 |
| 2002/0159447 | A1 * | 10/2002 | Carey et al. .................. 370/389 |
| 2003/0033418 | A1 * | 2/2003 | Young et al. ................. 709/230 |
| 2003/0093563 | A1 * | 5/2003 | Young et al. ................. 709/245 |
| 2004/0028035 | A1 * | 2/2004 | Read ............................ 370/352 |
| 2004/0068648 | A1 * | 4/2004 | Lewis et al. ................. 713/153 |
| 2005/0086379 | A1 * | 4/2005 | Asami ......................... 709/245 |
| 2005/0254484 | A1 * | 11/2005 | Barzegar et al. ............. 370/352 |

* cited by examiner

*Primary Examiner*—Firmin Backer
*Assistant Examiner*—Phuongchau B Nguyen
(74) *Attorney, Agent, or Firm*—Banner & Witcoff, Ltd.

(57) ABSTRACT

A system and method, e.g., Voice Proxy Server (VPS), is described for managing Voice over IP (VoIP) services between a NAT enabled private network and a public network such as the Internet. The VPS acts like the Call Agent to the nodes in the private network and it represents an embedded voice client to the real Call Agent in the public network. Each logical line of the VPS corresponds to a real voice line in the private node. VoIP signaling messages may be carried in the payload of the IP packets. VPS will properly translate IP address and/or port number information in the payload to correctly route the signaling data between networks. Additionally, VPS will forward the incoming Real Time Protocol (RTP) packets to the real destination in the private network.

19 Claims, 31 Drawing Sheets

NOTE:
VPS HAS THE FOLLOWING MAPPINGS IN ITS LINE MAPPING TABLE:
aaln/1 @ vps <-> aaln/1 @ vc2
aaln/3 @ vps <-> aaln/1 @ vc1

NOTE:
VPS HAS THE FOLLOWING MAPPINGS IN ITS LINE MAPPING TABLE:
aaln/1 @ vps <—> aaln/1 @ vc2
aaln/3 @ vps <—> aaln/1 @ vc1

NOTE:
VPS HAS THE FOLLOWING MAPPINGS IN ITS LINE MAPPING TABLE:
aaln/1 @ vps ←→ aaln/1 @ vc2
aaln/3 @ vps ←→ aaln/1 @ vc1

NOTE:
VPS HAS THE FOLLOWING MAPPINGS IN ITS LINE MAPPING TABLE:
aaln/1 @ vps ←→ aaln/1 @ vc2
aaln/3 @ vps ←→ aaln/1 @ vc1

NOTE:
VPS HAS THE FOLLOWING MAPPINGS IN ITS LINE MAPPING TABLE:
aaln/1 @ vps ←→ aaln/1 @ vc2
aaln/3 @ vps ←→ aaln/1 @ vc1

METHOD FOR PROVIDING VOICE-OVER-IP SERVICE

This application is a continuation of and claims priority to co-pending U.S. application Ser. No. 11/260,163, filed Oct. 28, 2005, which is a continuation of and claims priority to U.S. Pat. No. 7,006,436, filed Nov. 13, 2001, each of which is incorporated herein by reference in its entirety.

TECHNICAL FIELD

The present invention relates to managing network services between networks and in particular to managing voice-over-IP (VoIP) service in a Network Address Translation (NAT)-enabled private network environment.

BACKGROUND OF THE INVENTION

Data is transmitted over a network through paths in digital data packets that traverse routers in the network to arrive at a desired destination over IP protocols. Often, data streams must be delivered from a public network to a local node or device in a private network and vice versa. In these situations, any IP-based services are delivered to or from a local node or device through an entry or exit point of a local network. This entry/exit point functions as a gateway for data such that the public network recognizes a single address for the private network. Typically, Network Address Translation (NAT) is employed to present the private network to the Internet or other public network with one address. In this way, the NAT translates individual IP addresses for each device in the private network for the public network such that the private individual IP addresses are concealed from the public network. This results in conservation of addresses and added efficiency of the network interfaces.

Messages or data being transmitted in networks contain a header and payload. The header is the portion of a message or data that contains information that guides the message to the intended destination. Information contained in the header may include the address of the sender, the address of the receiver, precedence level, routing instructions, etc. Transmitted messages or data further contain a payload portion. The payload portion is in the data portion of the IP packet. An interface between the private network and the public network or Internet must know the mapping between a local node or device and its specific IP address and User Data Protocol (UDP) port to correctly route data to the proper destination. The Network Address Translation (NAT) at the gateway is such an interface. It establishes the said mapping between the private and public networks to interpret address data in the IP headers and delivers any incoming data to the desired local node or device.

However, VoIP protocols sometimes contain address information in the payload (i.e., data portion of the IP packet). One example of such a VoIP protocol is MGCP/NCS (Media Gateway Controller Protocol/Network-based Call Signaling protocol). MGCP/NCS protocol is used for call processing signaling control to provide Voice-over-IP (VoIP) services. In situations where specific IP address information and/or port number information is contained in the payload, the NAT, which only interprets data in the IP header, is unable to properly translate the address information or port number information. As a result, data is not properly delivered to the desired destination in the private network.

Further, the actual voice stream is carried by the Real-Time Transport Protocol (RTP). The IP address and port number information for the RTP packets are defined by the Session Description Protocol (SDP) included in the MGCP/NCS payload and need to be translated properly. In addition, the voice stream, i.e., the RTP packets, need to be routed properly to the intended destination. Therefore, the mapping information is necessary at the gateway for proper routing of data to the correct final destination within the private network. The data packet is delivered to the gateway of the private or local network and the gateway must then route the data to the intended destination within the private or local network. The NAT does not have address mapping information and therefore cannot properly route data to the desired destination node.

Therefore, there exists a need in the art to properly translate address and/or port number information such that VoIP signaling packets are delivered to the desired destination node within a private or local network and public network.

Further, there exists a need in the art to provide address mapping information and actually perform the routing if necessary for delivery of VoIP voice packets to the desired destination node within a private or local network and public network.

SUMMARY OF THE INVENTION

In one exemplary embodiment of the present invention, a method is provided for managing network services between a plurality of networks comprising receiving an Internet Protocol data packet with a corresponding address from a first network source, wherein the Internet Protocol data packet comprises a header and a payload and the payload of said Internet Protocol data packet contains at least a portion of a destination address; translating the destination address; and delivering the Internet Protocol data packet to a destination node on a second network based on said translating.

DETAILED DESCRIPTION OF THE INVENTION

Figure 1:
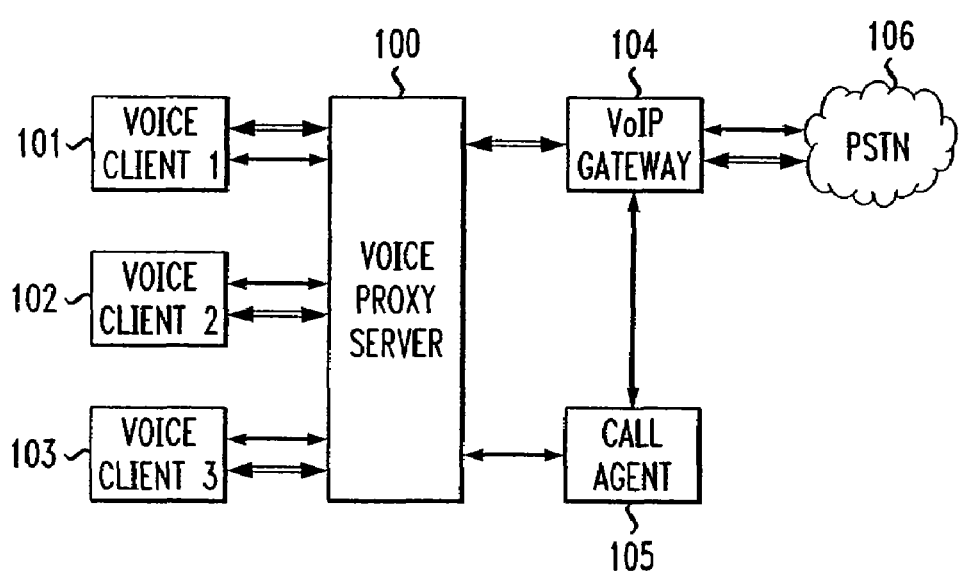
FIG. 1 is a block diagram illustrating an exemplary network with a voice proxy server of the present invention.

The present invention relates to a method and system of properly routing data, such as packets associated with Voice-over-IP (VoIP) service between networks. When data packets are transmitted through a network, specific IP address and/or port number information may be located in the payload. The NAT can only translate addresses in the IP header and those applications that use IP addresses in the IP payload will break at the NAT environment. Protocols that provide the VoIP service, for example, the Media Gateway Controller Protocol/Network-based Call Signaling Protocol (MGCP/NCS) provide VoIP messages, such as MGCP/NCS messages, that are carried in a UDP/IP message. In other words, the MGCP/NCS message is in the payload portion of a UDP/IP message. The MGCP message comprises a specific IP address and port number which are in the IP payload and cannot be translated by the NAT. Therefore, VoIP service cannot be provided in a NAT-enabled private network. The present invention provides a solution to support VoIP service that may co-exist with the NAT and provide a method and system of translating the address information of the message in the header and payload such that the data packet may be routed properly to the desired destination from a public network source to a local destination node in a private network and vice versa. Additionally, the invention also supports the routing of the incoming voice packets to the desired destination in the private network.

In an exemplary embodiment of the present invention, the MGCP/NCS protocol is used for call processing signaling control to provide VoIP services. It should be appreciated that the invention is not so limited, as a variety of IP protocols may be used without deviating from the scope or spirit of the present invention. For example, Session Initiation Protocol (SIP) may also be used and the system and method of the present invention may properly translate IP address and/or port number information.

MGCP messages are carried in the data portion (payload) of the UDP/IP packets with the header containing the identifier of the endpoints. An "endpoint" is a network element or component at the end of the network, such as a transmitter or receiver or an originating or terminating device, and may be represented by an endpoint identifying parameter, for example, an EndpointID. The endpoint identifying parameter comprises specific information to identify a particular network element or component. An example of a typical form of an endpoint identifying parameter, such as an EndpointID of an endpoint, is local-name@domain-name or an IP address. There are many parameters in the message header and many of these parameters require specific names, specific IP addresses and/or port numbers which may be all located in the IP payload.

For proper delivery of data packets to the desired node in a private network, a gateway may be utilized for receiving the data packets from the public network, such as the Internet for example, and routing the data packets to the desired node in the private network. Within the gateway, a voice proxy server (VPS) operates as the intermediary. Like the NAT, the VPS establishes an IP address/port mapping table when the VoIP clients in the private network initiate their contacts to the VoIP call agent in the public network. In addition, the VPS translates any address/port information in the IP payload before relaying the IP packets to a public network. The VPS then uses mapping information to deliver data packets from the public network to the desired destination within the private network as well as to deliver data packets from a node in a private network to the desired destination in the public network. For VoIP protocols wherein essential IP address or port number data is located in the payload, the VPS may properly translate the data for routing to the desired destination.

FIG. 1 illustrates an exemplary embodiment of a Voice Proxy Server (VPS) 100 of the present invention in relation to the local nodes in a private network. There may be any number of local nodes in the private network in connection with the VPS 100. For illustration purposes, FIG. 1 shows three voice clients (VC) 101, 102, and 103. Each of the local nodes has a private IP address. The VPS 100 has a globally unique registered IP address that is recognized by the public network. It is the access point for the private network to the public network, and vice versa. It should be noted that the VPS has twofold functionality. On the one hand, it acts as a "virtual call agent" to the voice clients on the private network while on the other hand, it behaves as multiple "virtual voice clients" to the Call Agent 105. These multiple "virtual voice clients" reside on the same address but different ports. This will be illustrated in the exemplary embodiments described herein.

When a call is placed from a local node, for example, a call signaling path is set up by the call agent (CA) 105. In one example, the call originates at the VC 101 and an off-hook signal is received at the VPS 100 and relayed to the CA 105. The CA 105 responds through the VPS 100 back to the VC 101 with a dial tone. The response from the CA 105 is returned to the address of the VPS 100, in this example, because the public network where the CA 105 resides need only recognize the one address of the VPS 100 rather than each and every local node in the private network.

As an example, the user inputs a destination number (e.g., phone number) which is relayed through the VPS 100 to the CA 105, then to the VoIP gateway 104 and to the Public Switched Telephone Network (PSTN) 106. Thus, the CA 105 manages call signaling. In this example, the private network nodes such as the VC 101, VC 102 or VC 103 each have unique private addresses and each communicates with the VPS 100. The CA 105 need only recognize the globally unique registered address of the VPS 100 in the public network. In this way, the VPS 100 acts as an embedded client to the CA 105 with several access lines. Each of the access lines corresponds to a real line in a node in the private network, such as the VC 101. At the same time, the VPS 100 acts as a "call agent" to the local nodes in the private network since the address of the CA 105 need not be recognized by the local nodes. Instead, the local nodes need only recognize the address of the VPS 100. In this exemplary embodiment, therefore, the public network need only recognize one address for all of the local nodes in a private network which is the address of the VPS 100.

As illustrated in this exemplary embodiment, the VPS 100 resides at a gateway which is on the edge of a broadband private network and functions as an entry/exit point to the public network. IP-based services, such as Voice-over-IP (VoIP), can be delivered to a private network through the VPS 100. VoIP data is received in data packets using VoIP protocols. One example of a commonly used VoIP protocol is Media Gateway Controller Protocol/Network-based Call Signaling protocol (MGCP/NCS). In such VoIP protocols, specific IP address information or port number information is contained in the payload of the message. The VPS 100 effectively translates the address or port number information in the payload of the message to route the data to the desired destination within the private network.

Figure 2:
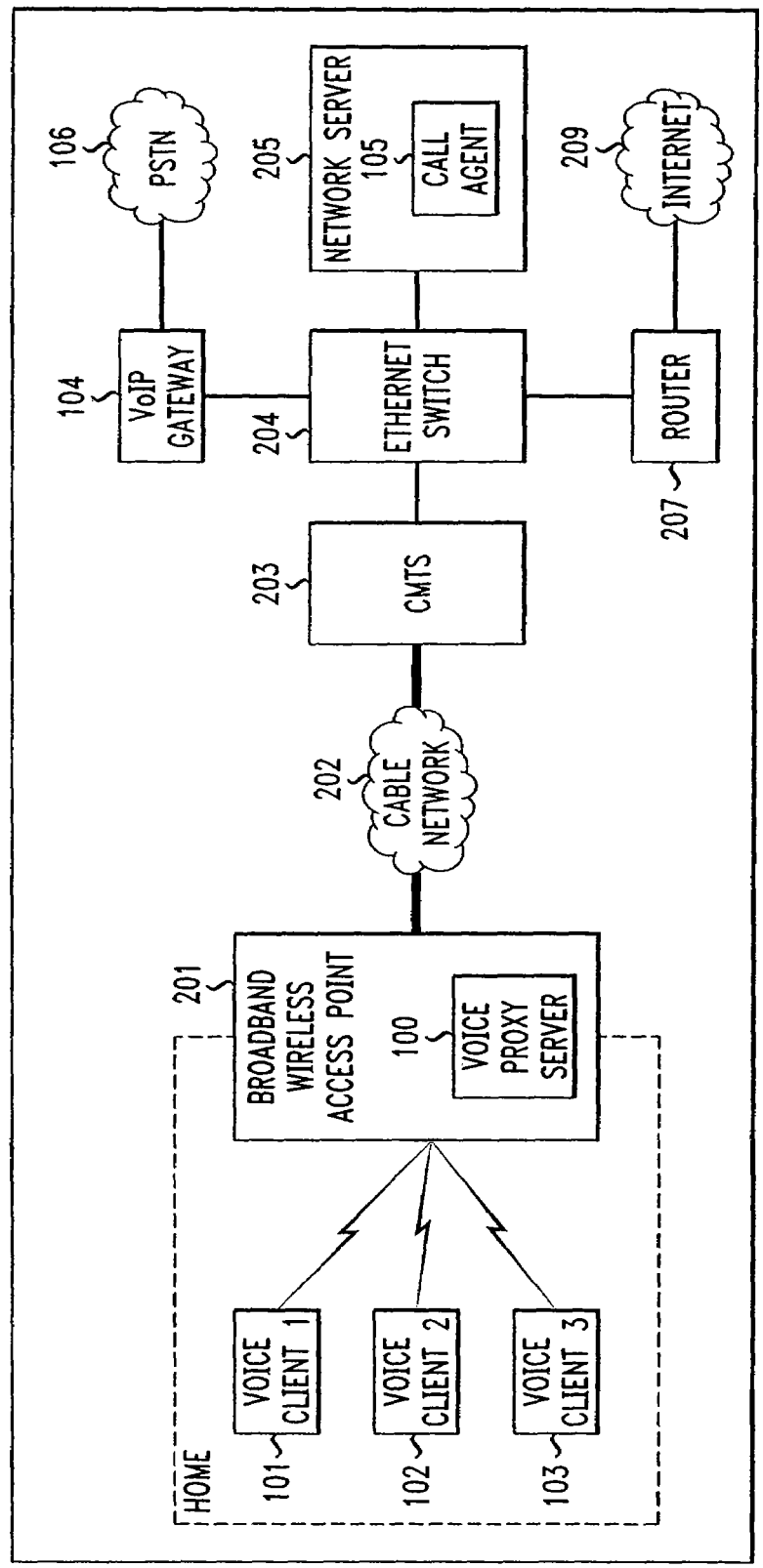
FIG. 2 is a block diagram illustrating an exemplary network with the voice proxy server and call agent.

FIG. 2 illustrates a second exemplary embodiment of the present invention. The private network as illustrated contains local nodes that may be voice clients 101, 102 or 103, for example. It is noted that the local nodes are not so limited and may be of any number. Each local node in the private network communicates with a broadband wireless access point 201 (BWAP). The BWAP 201 contains the VPS 100, which has a globally unique registered address. The BWAP connects through a cable network 202, for example, to network server 205, which contains the CA 105. In this example, data is transmitted through the Cable Modem Termination System (CMTS) 203, Ethernet switch 204 and through a VoIP gateway 104 to the Public Switched Telephone Network (PSTN) 106. Data may also be sent through routers 207 to the Internet 209. The CA 105 manages call signaling and recognizes the address of the VPS 100 in the BWAP 201; however, the CA 105 does not need to recognize each individual unique address of each local node in the private network. The voice proxy server 100 maps the local node in a private network, for example, to its specific IP address and/or UDP port. Such information is necessary for effective and accurate delivery of VoIP data packets.

Figure 3:
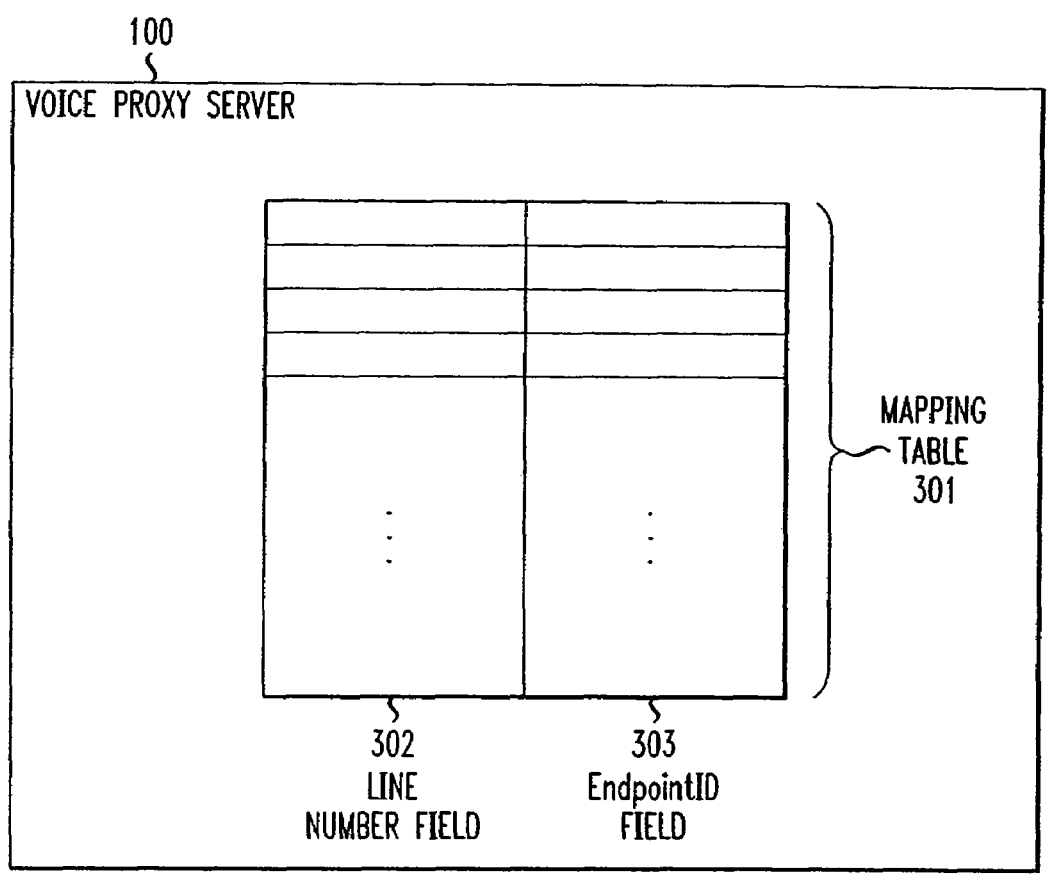
FIG. 3 is a block diagram illustrating the voice proxy server with a mapping table.

FIG. 3 illustrates an exemplary embodiment of the VPS 100 of the present invention. In this example, the VPS 100 contains a mapping table 301 for storing logical line numbers, actual endpoint identifying parameters, actual private IP address and port number, and all other related information as illustrated, available logical line numbers or the actual endpoint identifying parameters (EndpointIDs) associated with the logical line numbers may be stored, for example in a line number field 302 and in an EndpointID field 303, respectively.

Figure 4A:
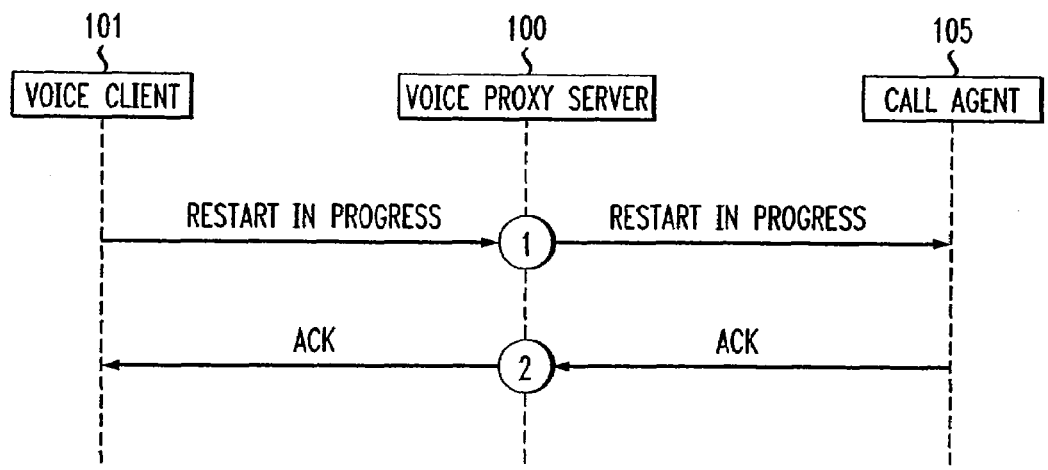
FIG. 4a illustrates message flow of a Restart in Progress (RSIP) in an exemplary embodiment of the present invention.
Figure 4B:
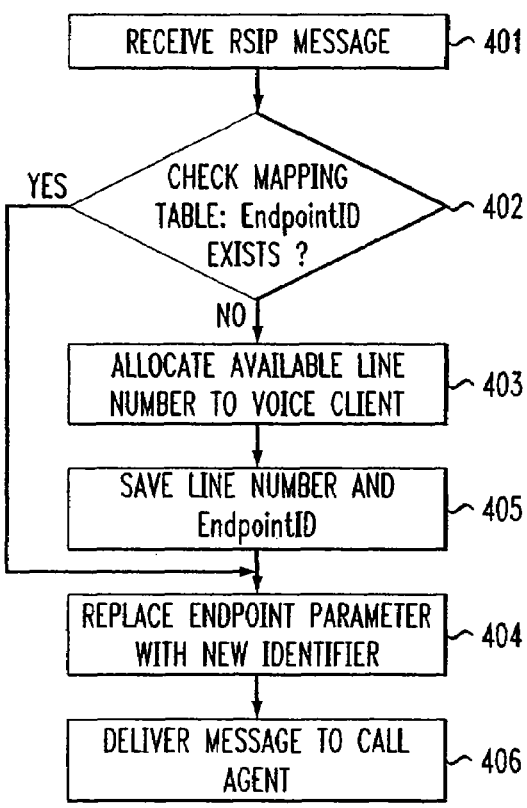
FIG. 4b is a flowchart illustrating an exemplary method of RSIP message flow.
Figure 4C:
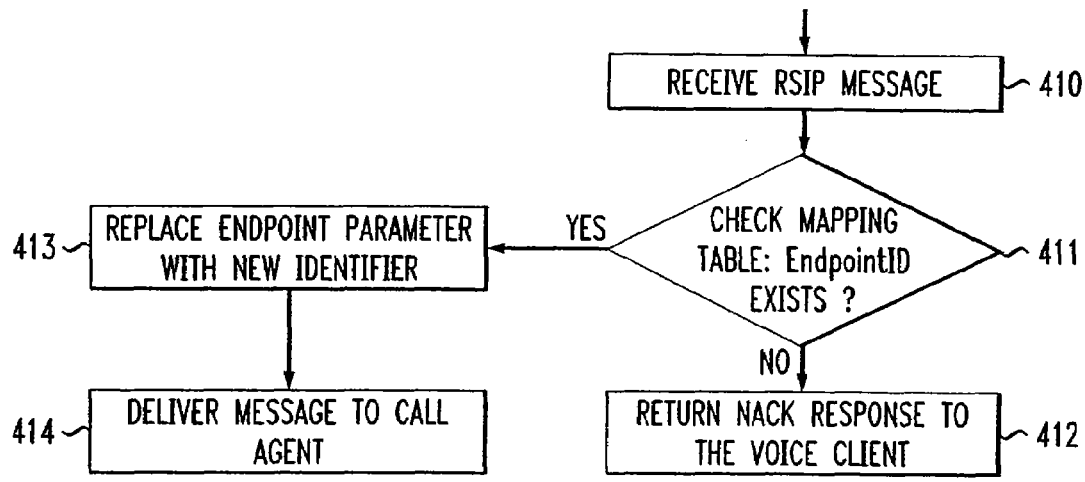
FIG. 4c is a flowchart illustrating an exemplary method of RSIP message flow with RestartMethod being "graceful" or "forced" or "disconnected".

FIG. 4a-FIG. 4c illustrate exemplary applications of the VPS 100 and the mapping table 301. In an exemplary embodiment illustrated in FIG. 4a and FIG. 4b, a Restart in Progress (RSIP) message is received at the VPS 100 from a voice client 101 with an endpoint identifying parameter such as EndpointID and RestartMethod specified (step 401). In one illustrative embodiment, the RestartMethod="restart" and, in response to receiving the RSIP message (step 401), the VPS 100 verifies that the particular EndpointID exists by referencing a line mapping table (step 402). If the corresponding EndpointID is found, then the endpoint ID parameter is replaced with a new identifier (step 404) and the message or command is delivered to the CA 105 (step 406). If the corresponding EndpointID is not found (step 403), an available line number to the voice client 101 is stored in the line mapping table with a corresponding endpoint identifying parameter (e.g., EndpointID) such that the corresponding line number of the EndpointID may be retrieved from the mapping table (step 405). The EndpointID parameter is replaced with a new identifier (step 404) and the message or command is delivered to the CA 105 (step 406).

In another illustrative application illustrated in FIG. 4c, the RestartMethod="graceful" or "forced" or "disconnected" and, in response to receiving the RSIP message (step 410), the VPS 100 verifies that the particular EndpointID exists by referencing the line mapping table (step 411). Endpoints that have been recognized and powered up and therefore "exist" may send "graceful", "forced" or "disconnected" messages. Therefore, if a "graceful", "forced" or "disconnected" message is received and if the corresponding EndpointID is not found, an error most likely occurred. In this case, the VPS sends a NACK response back to the voice client 101. The NACK response is a negative acknowledgement response that indicates that the EndpointID is incorrect. Otherwise, the endpoint is identified, a NACK response is not returned and the line number of the corresponding EndpointID from the mapping table is retrieved and the EndpointID parameter is replaced with a new identifier (step 413). The RSIP message is then delivered to the CA 105 (step 414).

Figure 5A:
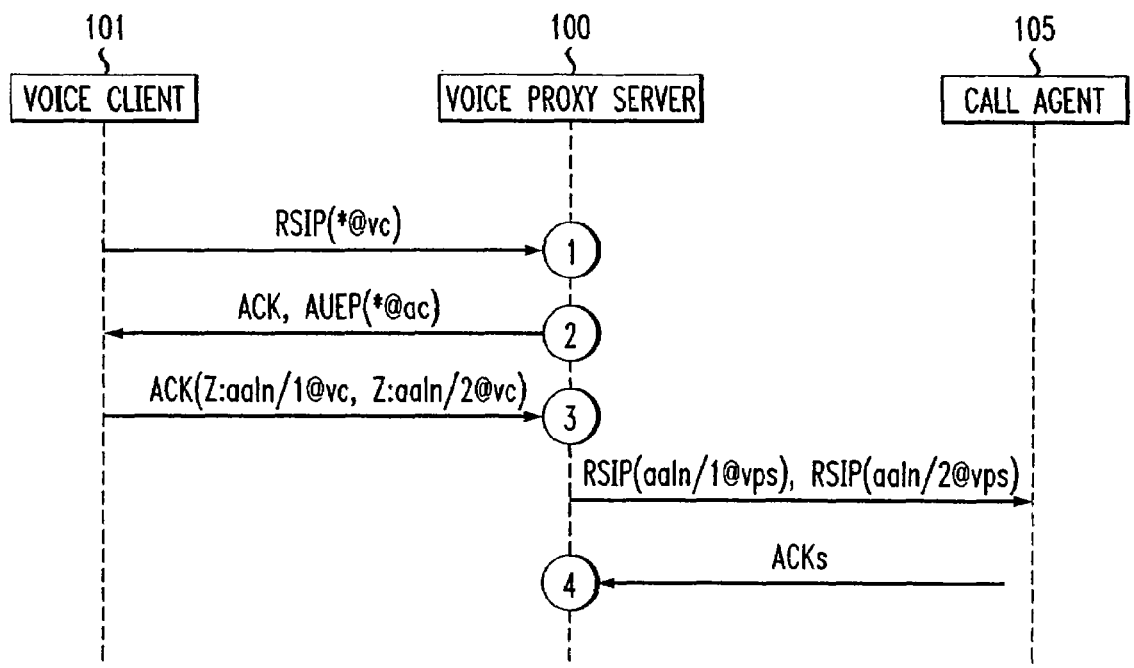
FIG. 5a illustrates an exemplary embodiment of message flow in client registration.
Figure 5B:
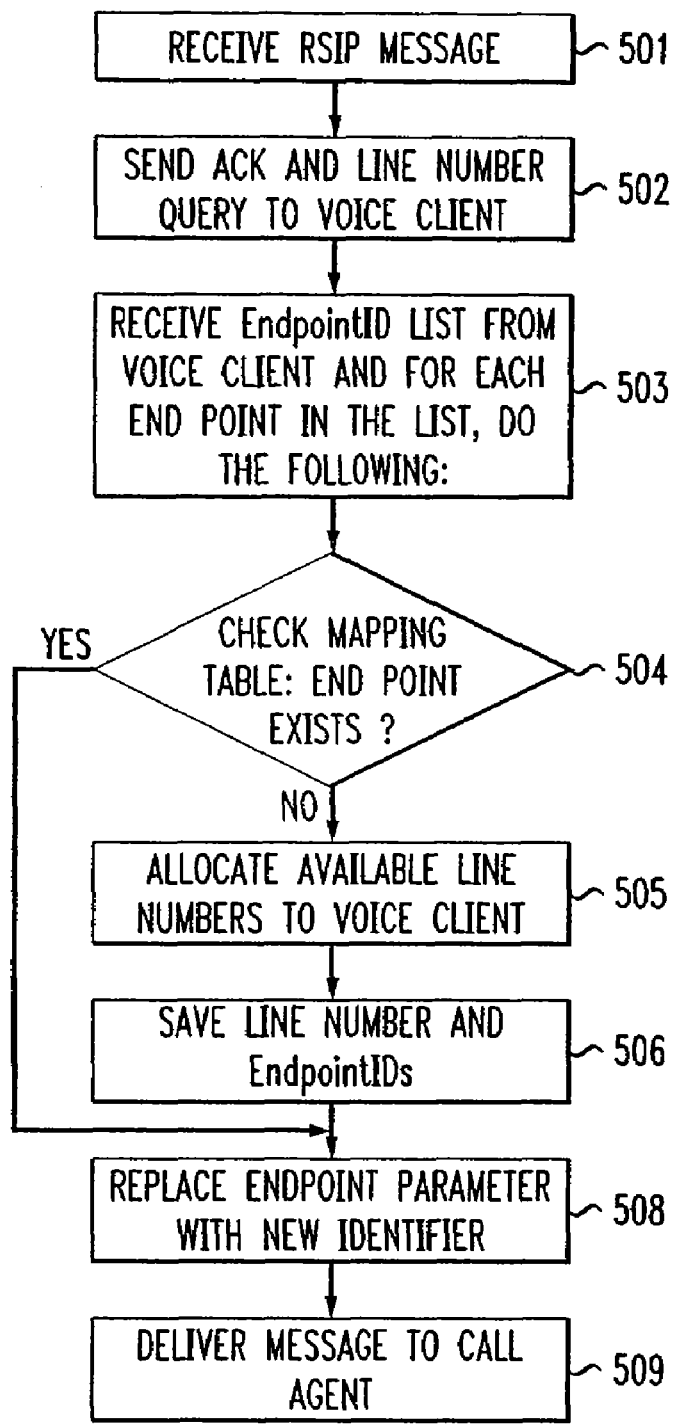
FIG. 5b is a flowchart illustrating an exemplary method of RSIP message flow; the voice proxy server 100 receives a RSIP message with EndpointID="*@VC" and RestartMethod="restart".
Figure 5C:
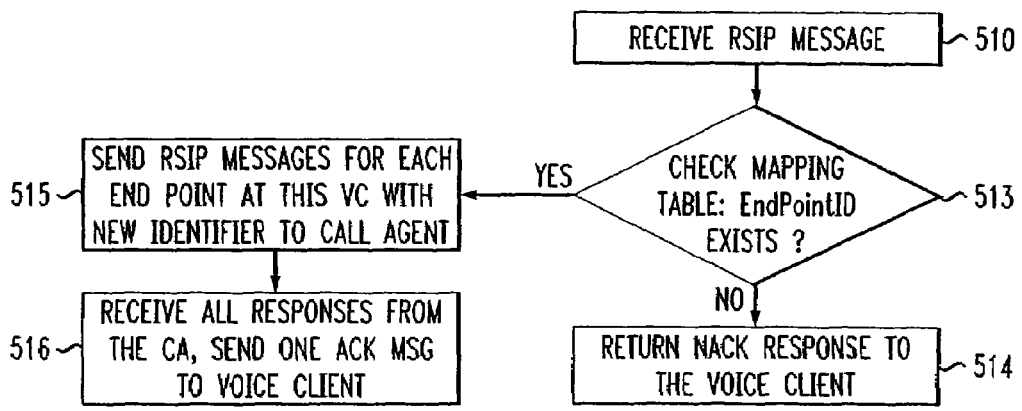
FIG. 5c is a flowchart illustrating an exemplary method of RSIP message flow with RestartMethod—"graceful", "forced", or "disconnected".

FIGS. 5a-5c illustrate another exemplary application of the VPS 100 of the present invention. In this example as illustrated in FIG. 5a and FIG. 5b, the VPS 100 receives a RSIP message with EndpointID="*@VC" and RestartMethod="restart" (step 501). The VPS 100 returns an ACK and AUEP message with EndpointID="*@VC" querying the number of lines the voice client 101 has (step 502). The voice client 101 sends a list of EndpointIDs to the VPS 100 (step 503) and the VPS 100 accesses the line mapping table to verify whether the EndpointIDs exist (step 504). If the EndpointIDs do not exist, the VPS 100 allocates a logical line number to each of the endpoints of the voice client 101 (step 505) and saves all line numbers and corresponding EndpointID information in the mapping table such that the corresponding line number of the EndpointIDs may be retrieved from the mapping table (step 506). The EndpointID parameter is replaced with a new identifier (i.e., the VPS's ID and line number) (step 508) and the message is delivered to the CA 105 (step 509).

In another illustrative application depicted in FIG. 5c, RestartMethod="graceful", "forced" or "disconnected" and, in response to receiving the RSIP message from the voice client 101 (step 510), the VPS accesses the line mapping table to verify that the corresponding voice client 101 exists in the line mapping table (step 513). If the address is not found, an error most likely occurred and the VPS returns a NACK response. A NACK response is a negative acknowledgement response that indicates that an EndpointID is incorrect. Otherwise, the address is found, the VPS does not return a NACK response and for each endpoint of the voice client, the VPS 100 sends a RSIP message with the EndpointID parameter set to the new identifier to the call agent (step 515). When all responses from the call agent are received, the VPS sends an ACK message to the voice client (step 516).

Figure 6A:
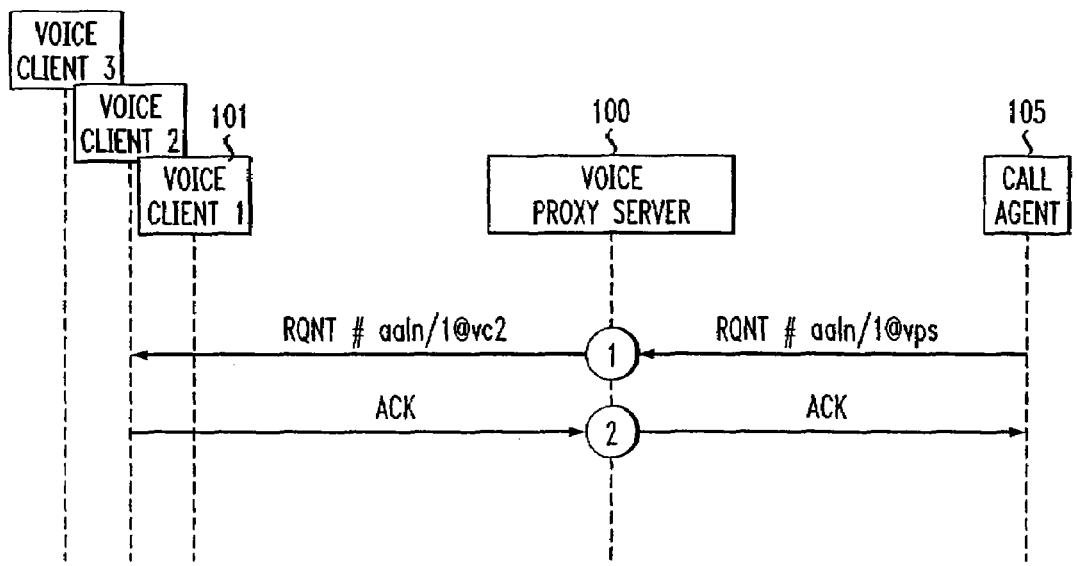
FIG. 6a illustrates an exemplary embodiment of message flow in Notification Request (RQNT).
Figure 6B:
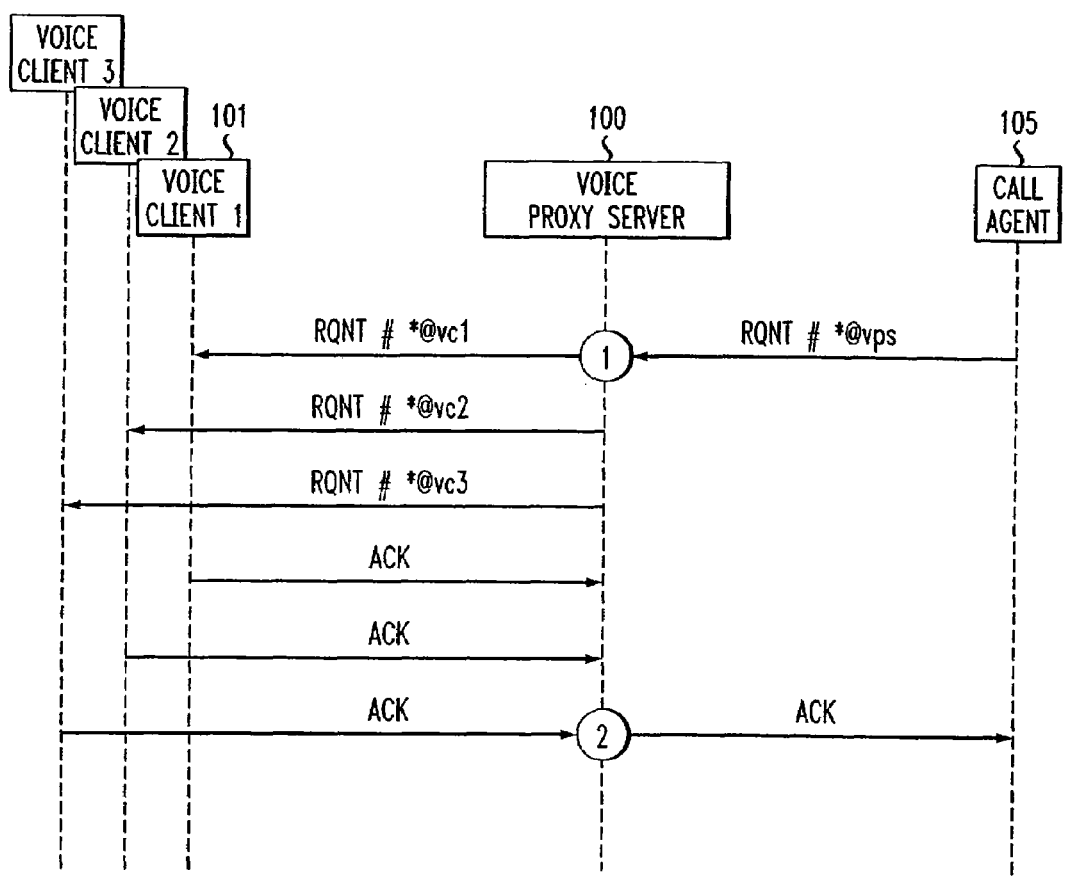
FIG. 6b illustrates an exemplary embodiment of message flow in Notification Request (RQNT) wherein EndpointID is a wild card.
Figure 6C:
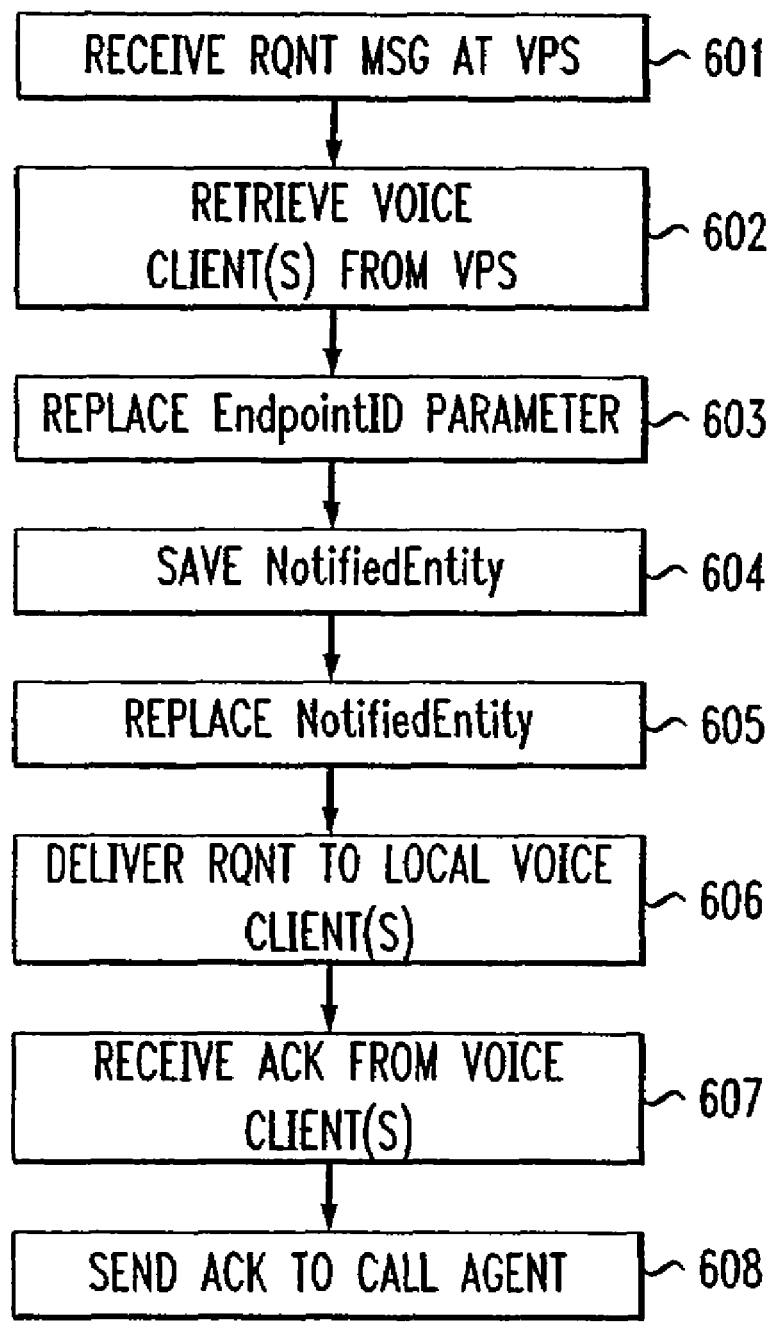
FIG. 6c is a flowchart illustrating an exemplary method of RQNT message flow with EndpointID and NotifiedEntity specified.

FIG. 6a-FIG. 6c illustrate another exemplary application of the VPS 100 of the present invention. In this example, the VPS 100 receives a Notification Request (RQNT) message from a CA 105 (step 601), the RQNT having a single EndpointID (FIG. 6a) or multiple EndpointIDs, e.g., a wild card EndpointID (FIG. 6b). A parameter specifying notification such as a NotifiedEntity parameter may also be specified. In this example, the VPS retrieves the local voice client in the case of a single EndpointID or a plurality of voice clients in the case of multiple EndpointIDs or a wild card EndpointID from the line mapping table according to the EndpointID(s) specified in the RQNT command (step 602), saves the NotifiedEntity that is specified in the RQNT command (step 604), replaces the EndpointID parameter(s) with the local voice client identifier(s) (step 603) and replaces the NotifiedEntity with the address of the VPS (step 605). The RQNT command is then delivered to the desired local voice client(s) (step 606), which responds back to the VPS with an ACK (step 607). After the response is received from the voice client 101 (or all of the voice clients 101 in the case of multiple voice clients 101), the VPS may then send the response to the CA 105 (step 608).

Figure 7A:
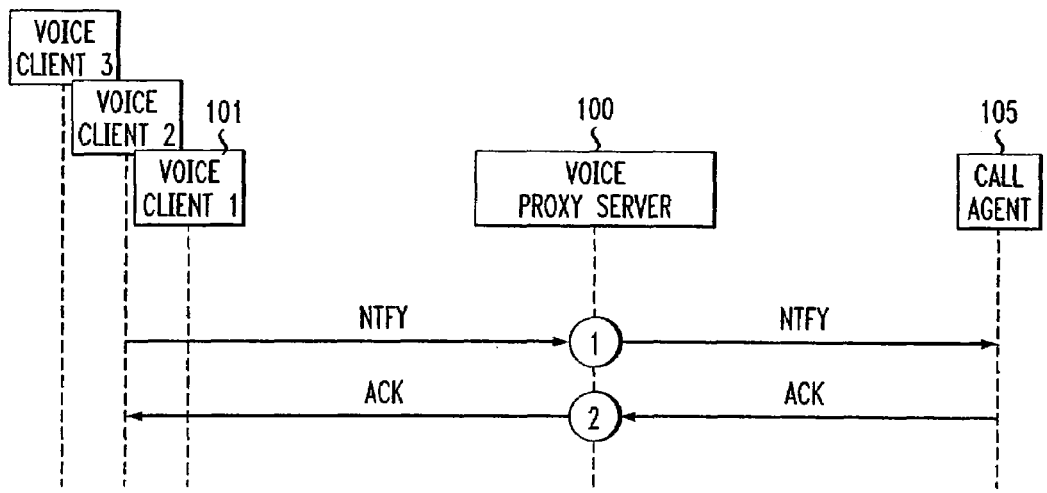
FIG. 7a illustrates an exemplary embodiment of message flow for Notification (NTFY).
Figure 7B:
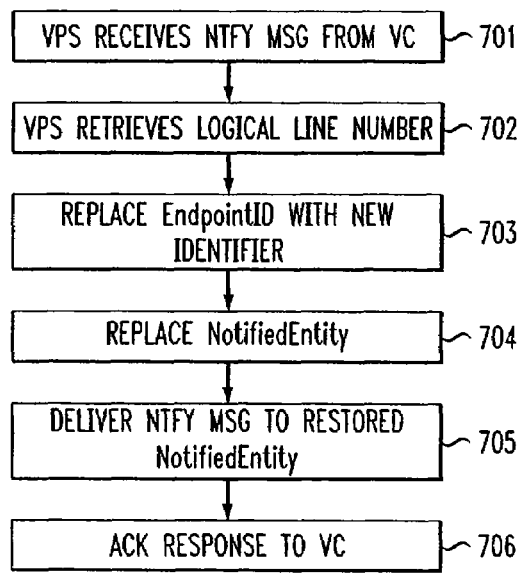
FIG. 7b is a flowchart illustrating an exemplary method of NTFY message flow.

FIGS. 7a and 7b illustrate another exemplary application of the VPS 100 of the present invention. In this example, the VPS 100 receives a Notify (NTFY) message from the voice client (step 701). A NotifiedEntity parameter may also be specified. After receiving the NTFY message, the VPS retrieves the logical line number from the line mapping table (step 702) according to the EndpointID specified in the NTFY command. The EndpointID parameter is replaced with a new identifier (i.e., aaln/LN@VPS) (step 703) and the NotifiedEntity parameter is replaced with a previously saved identifier (step 704). The NTFY command is delivered to the restored NotifiedEntity (step 705), which corresponds to the call agent 105. The VPS 100 sends the response received to the voice client 101 (step 706).

Figure 8A:
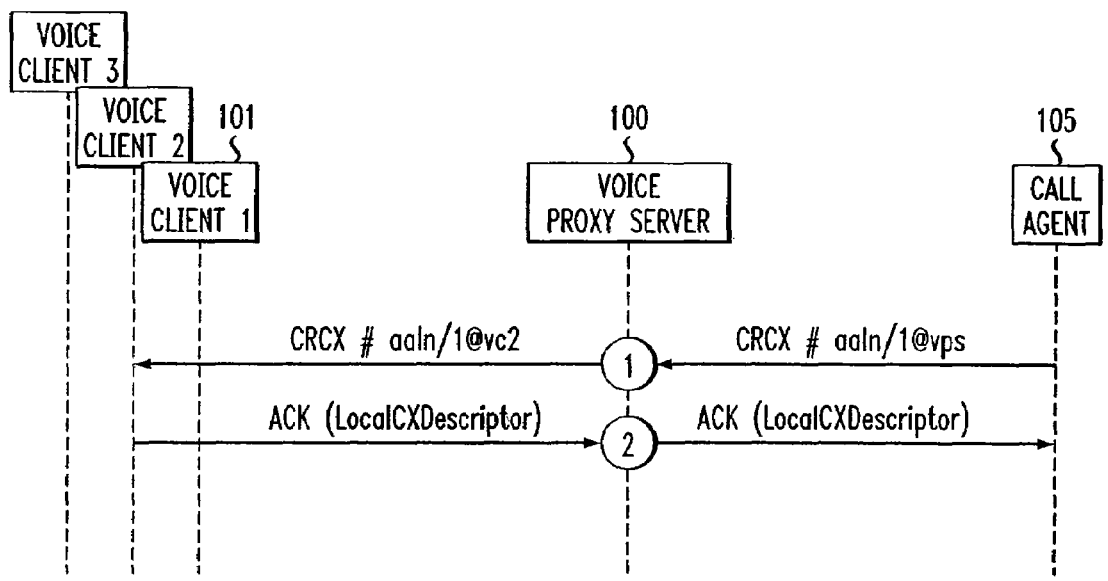
FIG. 8a illustrates an exemplary embodiment of message flow for Create Connection (CRCX).
Figure 8B:
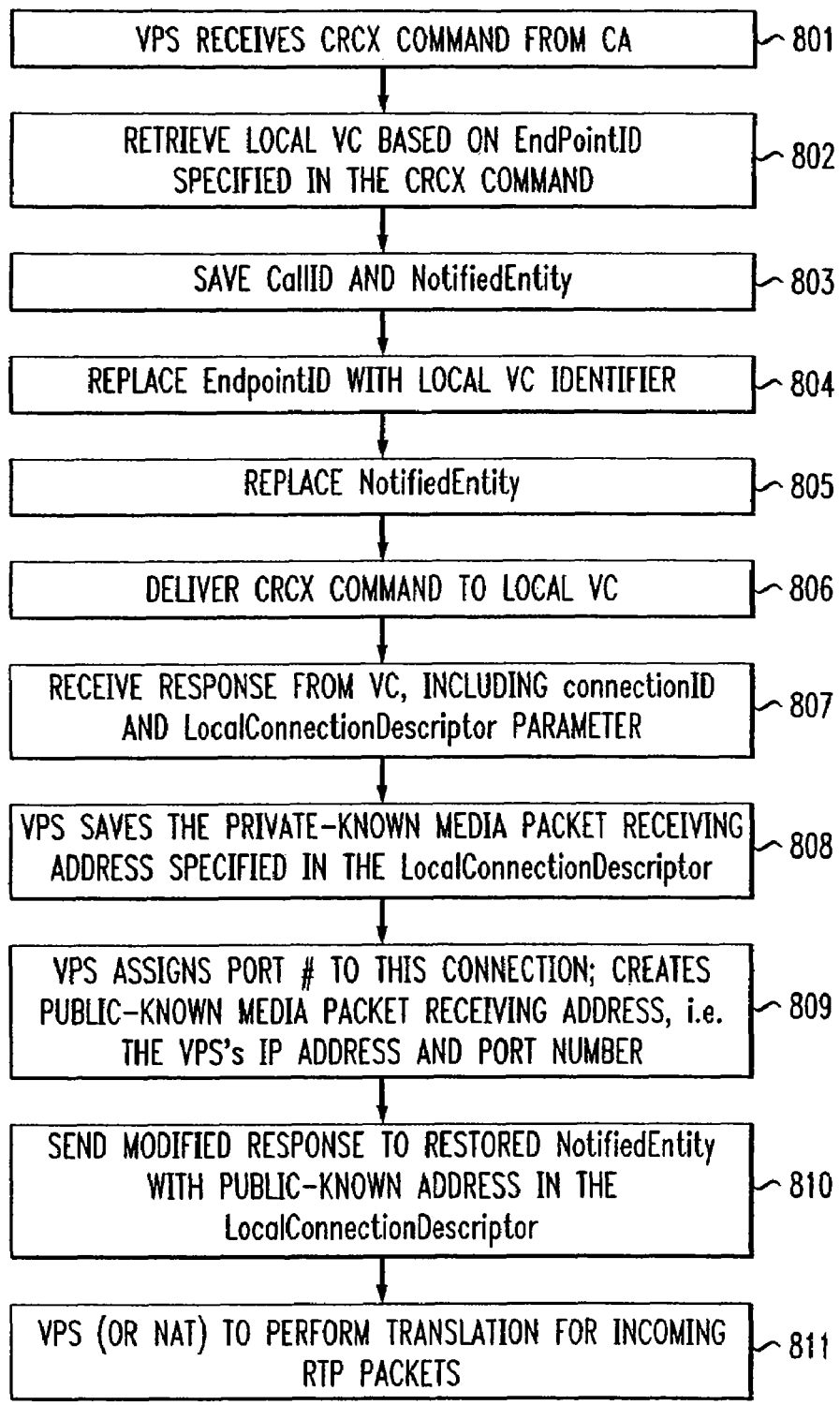
FIG. 8b is a flowchart illustrating an exemplary method of CRCX message flow where EndpointID is a single endpoint.

FIG. 8a and FIG. 8b illustrate another exemplary application of the VPS 100 of the present invention. In this example, the VPS 100 receives a create connection (CRCX) command from a call agent (step 801) with EndpointID being a single endpoint (e.g., the VPS 100). The CallID and NotifiedEntity may also be specified. After the CRCX command is received at the VPS 100, the local voice client 101 is retrieved from the line mapping table based on the specified EndpointID in the CRCX command (step 802). CallID and NotifiedEntity as specified in the CRCX command are saved (step 803). The EndpointID parameter is then replaced with the local voice client identifier (step 804) and the NotifiedEntity is replaced with the address of the VPS 100 (step 805). The CRCX command is then delivered to the designated desired local voice client 101 (step 806) which returns a response with a descriptive parameter such as a LocalConnectionDescriptor parameter to the VPS 100 (step 807). The VPS 100, after receiving the response with the LocalConnectionDescriptor from the voice client 101, saves a parameter identifying the connection such as the ConnectionID and saves the IP address and Port number specified in the LocalConnectionDescriptor parameter (step 808) (i.e., private-known media packet receiving address). A port number is assigned within the VPS 100 to this connection, this port number and the IP address of the VPS 100 being the public-known media packet receiving address (step 809). This public to private address mapping information is stored. Then the modified response with the VPS's IP address and Port number (i.e., the public-known address) in the LocalConnectionDescriptor is sent to the restored NotifiedEntity (step 810), which corresponds to the call agent 105 (step 2 in FIG. 8a). The VPS then waits to receive the voice/data packets on the assigned port and forward them to the port of the voice client 101. Alternatively, the NAT (Network Address Translation) may be informed of the public to private address mapping to perform proper translation for incoming data packets.

Figure 9A:
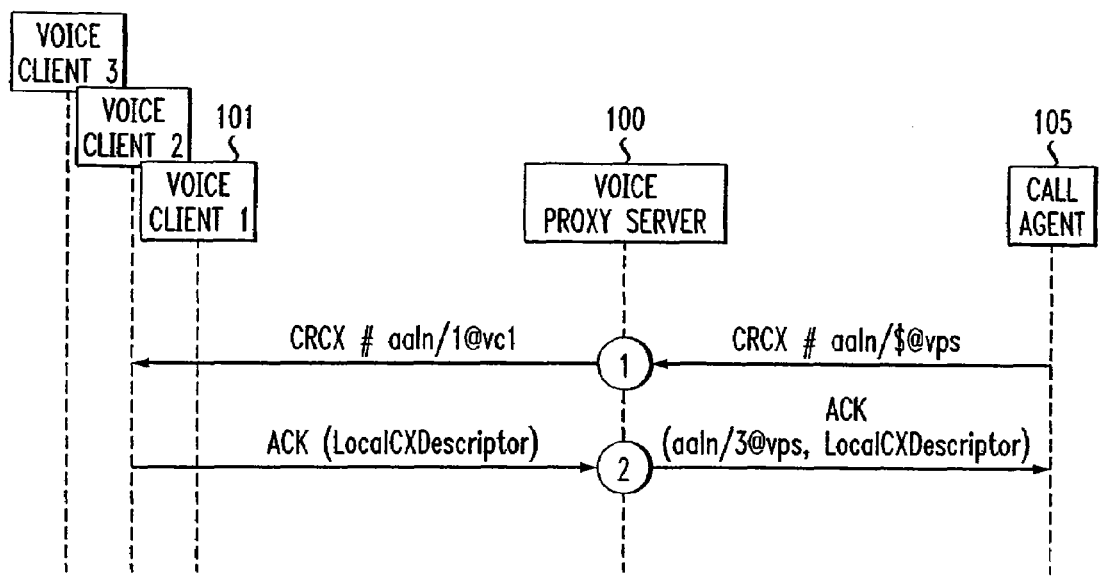
FIG. 9a illustrates an exemplary embodiment of message flow for Create Connection (CRCX) where EndpointID is a wild card.
Figure 9B:
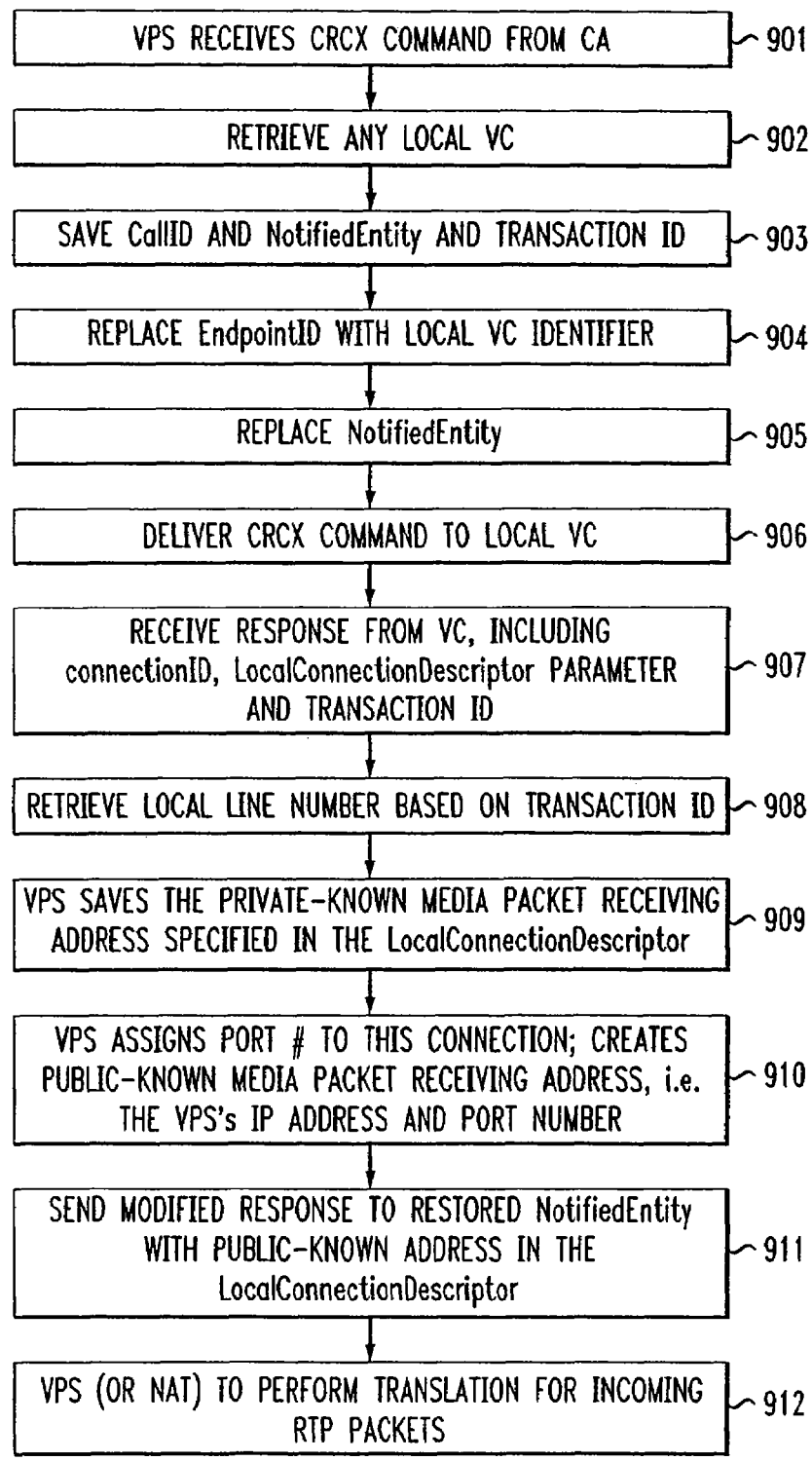
FIG. 9b is a flowchart illustrating an exemplary method of CRCX message flow where EndpointID is a wild card.

FIG. 9a and FIG. 9b illustrate another exemplary application of the VPS 100 of the present invention. In this example, the VPS 100 receives a create connection (CRCX) command from a call agent (step 901) with EndpointID having a wild card, "$". The CallID and NotifyEntity may also be specified. The VPS 100 retrieves any one of the local voice clients from the line mapping table (step 902). The CallID, NotifiedEntity, and Transaction Identifier as specified in the CRCX command are saved (step 903). The EndpointID parameter is replaced with the local voice client identifier (step 904) and the NotifiedEntity is replaced with its own address (step 905). The CRCX command is then delivered to the local voice client from the voice proxy server (step 906). Then the voice client returns a response with a LocalConnectionDescriptor parameter and Transaction Identifier to the VPS 100 (step 907). The VPS 100 retrieves the logical line number from its line mapping table based on the Transaction Identifier (step 908). The ConnectionID is saved and the IP address and Port number specified in the LocalConnectionDescriptor parameter from the voice client is saved as a private-known media packet receiving address (step 909). A port number within the VPS is assigned to this connection so that the public-known media packet receiving address is the VPS's IP address and port number. This public to private address mapping information is saved (step 910). The modified response with VPS IP address, Port number in the LocalConnectionDescriptor and the VPS logical line number in the SpecificEndPointID is sent to the restored NotifiedEntity (step 911), which corresponds to the call agent 105 (step 2 in FIG. 9a). The VPS then waits to receive the voice/data packets on the assigned port and forward them to the port of the voice client 101. Alternatively, the NAT (Network Address Translation) may be informed of the public to private address mapping to perform proper translation for incoming data packets.

Figure 10A:
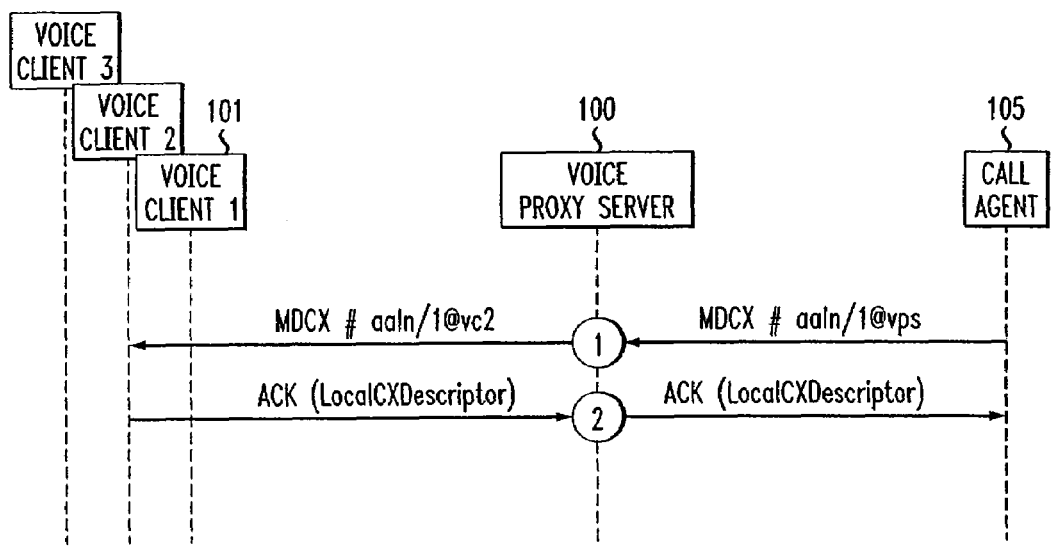
FIG. 10a illustrates an exemplary embodiment of message flow for Modify connection (MDCX).
Figure 10B:
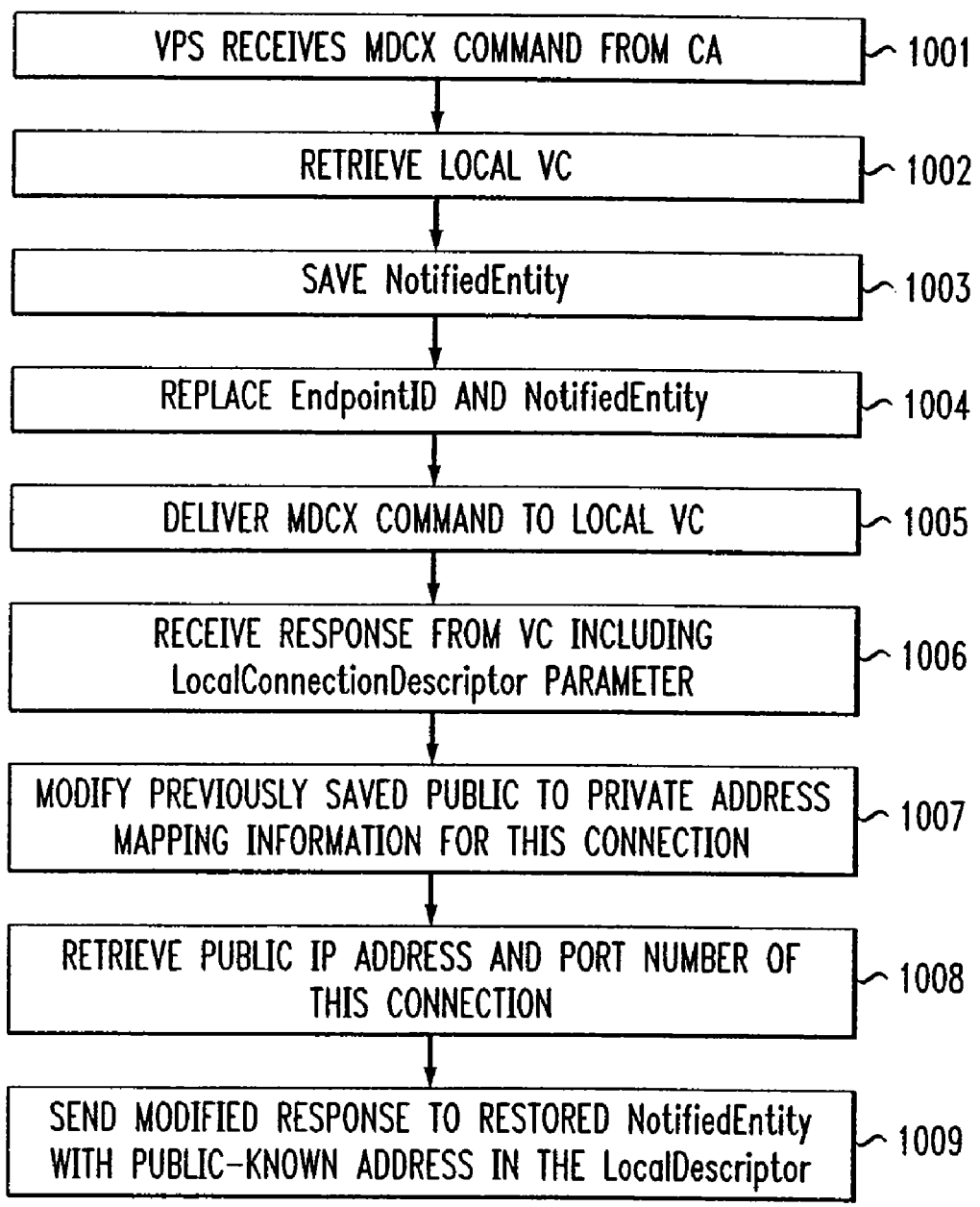
FIG. 10b is a flowchart illustrating an exemplary method of MDCX message flow where EndpointID is a single endpoint and NotifiedEntity is specified.

FIG. 10a and FIG. 10b illustrate another exemplary application of the VPS 100 of the present invention. In this example, the VPS receives a MDCX message from a call agent (step 1001) with the EndpointID being a single endpoint (e.g., a voice line at the VPS). After receiving the MDCX message, the local voice client is retrieved from the line mapping table according to the EndpointID specified in the MDCX command (step 1002). The NotifiedEntity is saved (step 1003). The EndpointID parameter is replaced with the local voice client identifier and the NotifiedEntity is replaced with the address of the VPS 100 (step 1004). The MDCX command is then delivered to the local voice client (step 1005). After receiving a response from the voice client with a LocalConnectionDescriptor parameter (step 1006), the voice proxy system modifies a previously saved public to private address mapping information for this connection (step 1007) so that the private IP address and port number will have the new specified value. The VPS sets up a new receiving port to forward voice/data packets to the voice client. Alternatively, the NAT (Network Address Translation) may be informed of the public to private address mapping to perform proper translation for incoming data packets (not shown). The public IP address and port number of the connection is retrieved (step 1008) and the modified response is sent to the restored NotifiedEntity (i.e., the call agent 105) using the public-known address in the LocalConnectionDescriptor (step 1009).

Figure 11A:
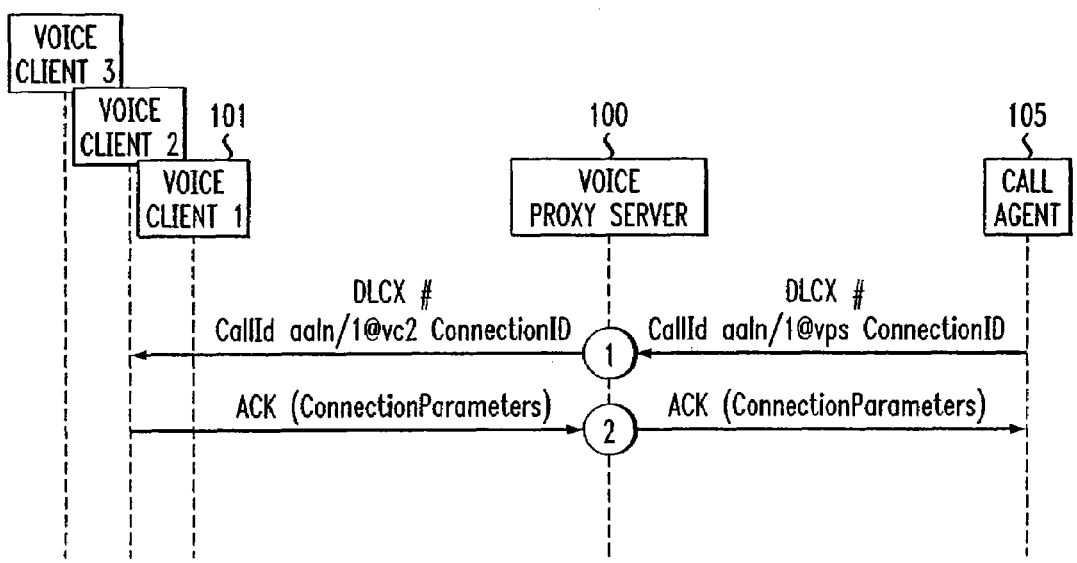
FIG. 11a illustrates an exemplary embodiment of message flow for Delete Connection (DLCX) from a call agent.
Figure 11B:
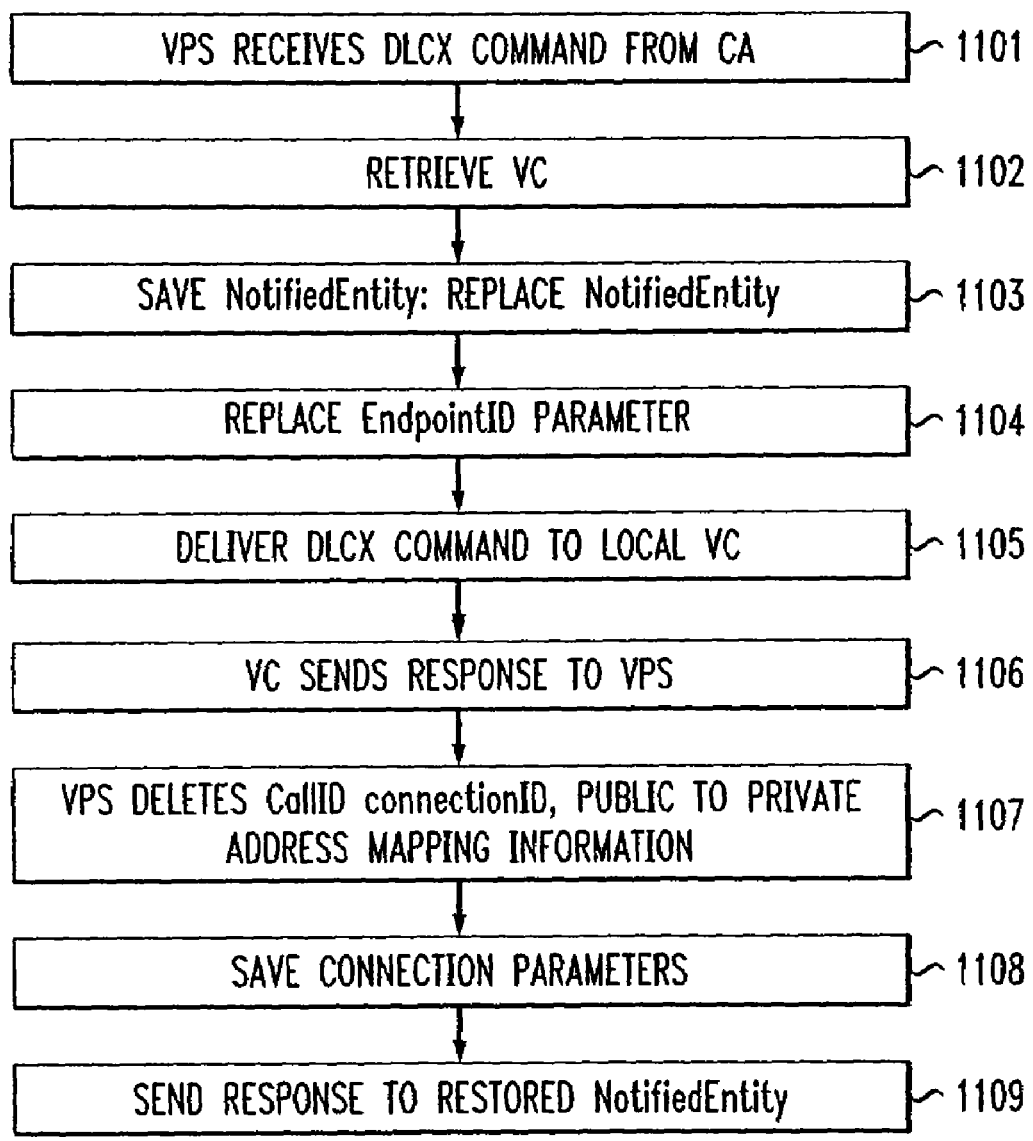
FIG. 11b is a flowchart illustrating an exemplary method of DLCX message flow where EndpointID is a single endpoint and Notifiedentity is specified.

FIG. 11a and FIG. 11b illustrate another exemplary application of the VPS 100 of the present invention. In this example, the VPS receives a DLCX command from a call agent with the EndpointID being a single endpoint (step 1101). The Notified Entity, ConnectionID and CallID may be specified. The local voice client is retrieved from the line mapping table according to the EndpointID specified in the DLCX command (step 1102). The NotifiedEntity parameter is saved and replaced with the address of the VPS 100 and the EndpointID parameter is replaced with the local voice client identifier (step 1103). The modified DLCX command is delivered to the local voice client (step 1105) and the voice client sends a response to the VPS 100 (step 1106). The CallID, ConnectionID information and associated public to private address mapping information is deleted (step 1107). The NAT may be requested to disable the address translation (not shown) or the VPS will disable the translation if it was performed by itself. The parameters associated with the connection such as the ConnectionParameters are saved for performance measurements (step 1108). Finally, the response to the restored NotifiedEntity is sent to the call agent (step 1109), the "restored NotifiedEntity" indicating the address of the call agent 105.

Figure 12A:
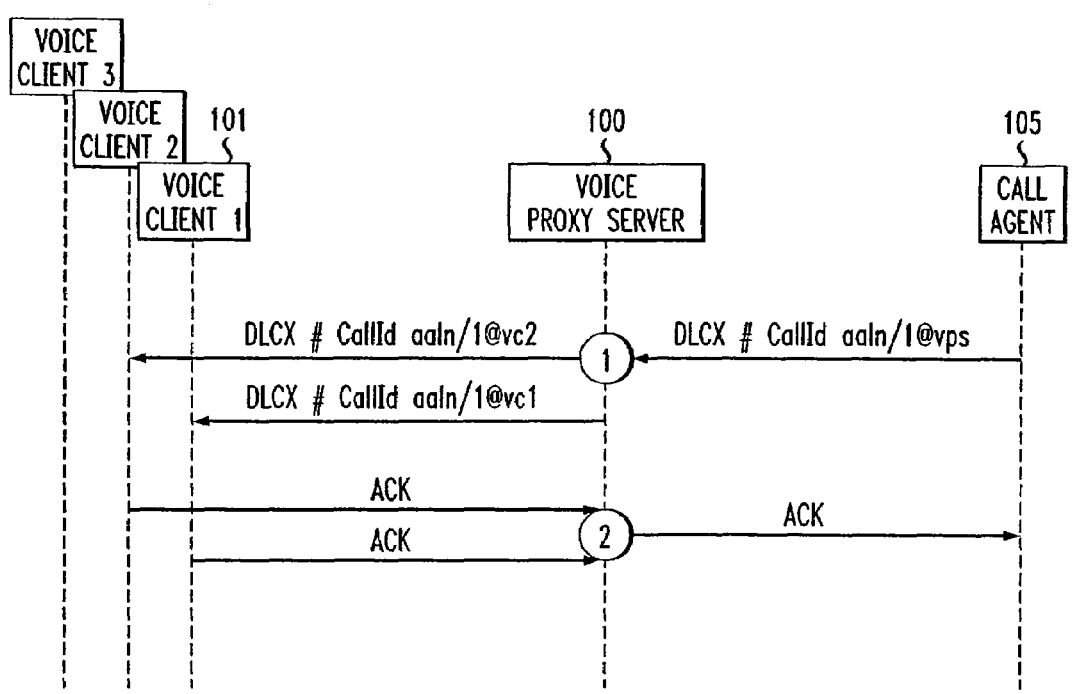
FIG. 12a illustrates an exemplary embodiment of message flow for Delete Multiple Connections from a call agent where ConnectionID is not specified.
Figure 12B:
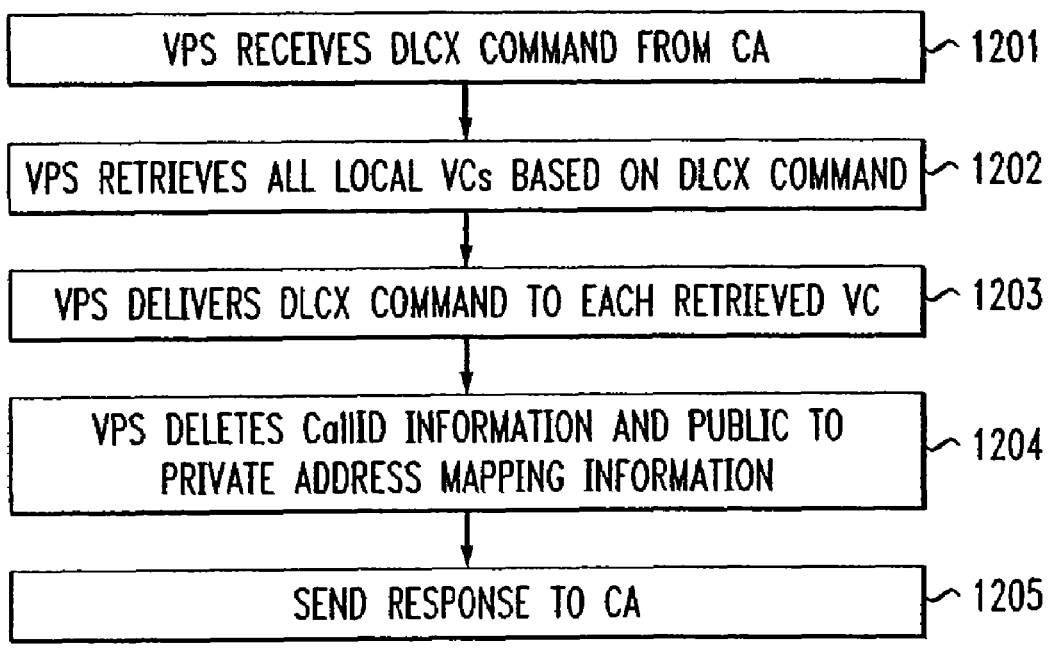
FIG. 12b is a flowchart illustrating an exemplary method of Delete Multiple Connections message flow.

FIG. 12a and FIG. 12b illustrate another exemplary application of the VPS 100 of the present invention. In this example, the VPS receives a Delete Multiple connection (DLXC) command with only CallID and EndpointID being specified (step 1201). The local voice clients are retrieved from the line mapping table according to the CallID and EndpointID specified in the DLCX command (step 1202). The VPS delivers the DLCX command to each of the retrieved voice clients (step 1203). After all responses are received from the voice clients, the VPS deletes CallID information and all the associated public to private address mapping information (step 1204) and sends one response back to the call agent (step 1205). The voice proxy system may need to request the NAT to disable all the associated address translations or it will stop all the address translations (not shown).

Figure 13A:
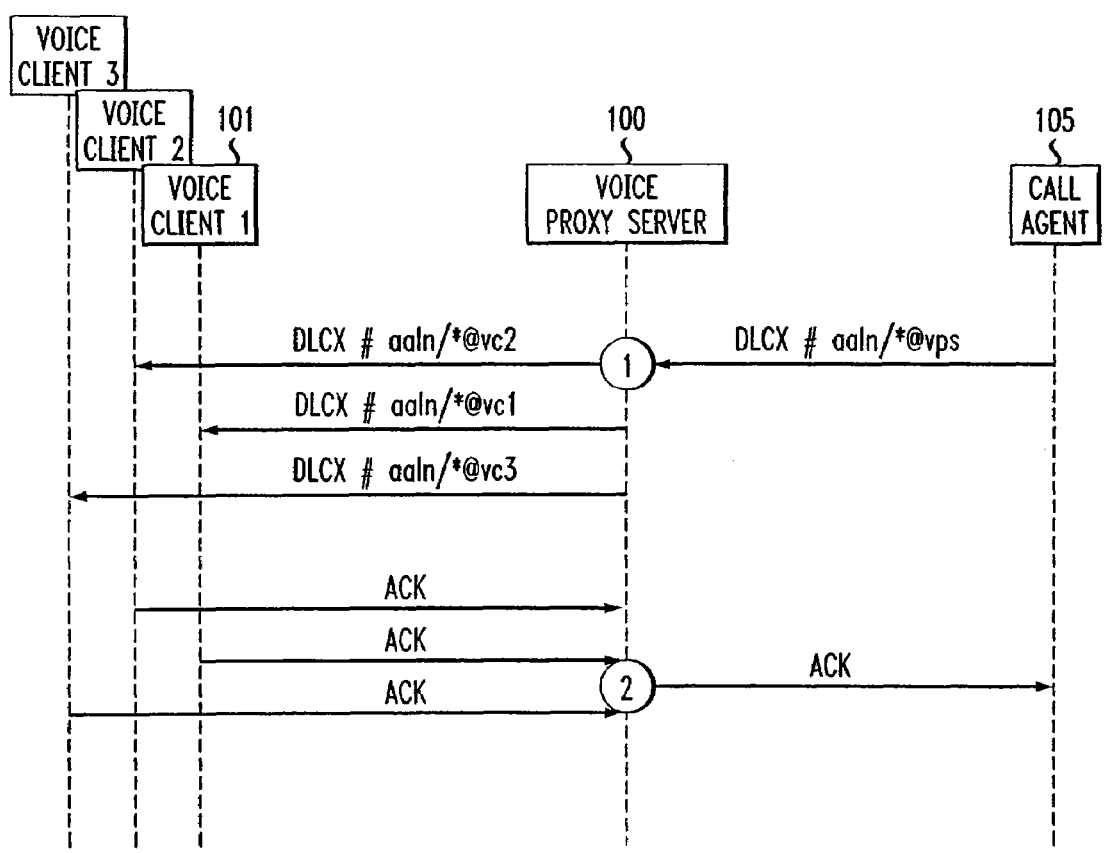
FIG. 13a illustrates an exemplary embodiment of message flow for Delete Multiple connections from a call agent where CallID and ConnectionID are not specified.
Figure 13B:
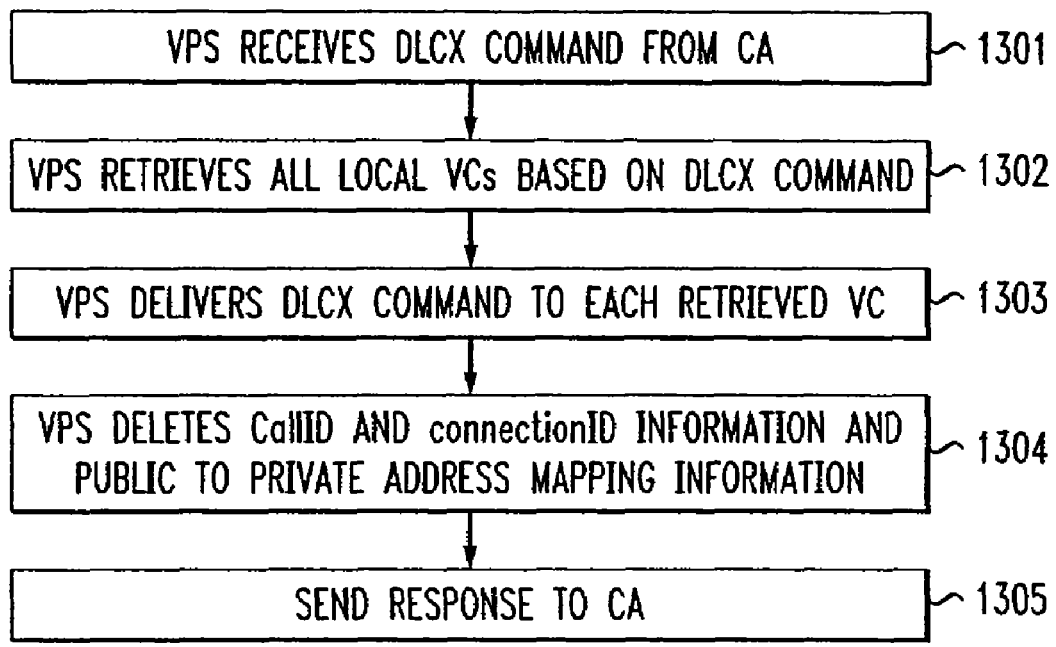
FIG. 13b is a flowchart illustrating an exemplary method of Delete Multiple connections message flow.

FIG. 13a and FIG. 13b illustrate another exemplary application of the VPS 100 of the present invention. In this example, the VPS receives a Delete Multiple connection (DLXC) command with only EndpointID being specified. The VPS receives a DLCX message from a call agent (step 1301) with only EndpointID being specified, then retrieves all local voice clients from the line mapping table according to the EndpointID specified in the DLCX command (step 1302). The VPS delivers the DLCX command to each of the retrieved voice clients (step 1303). After all responses are received from the voice clients, the VPS deletes CallID information. Connection ID information, and all the associated public to private address mapping information (step 1304) and sends one response back to the call agent (step 1305). The VPS may also request the NAT to disable all the associated address translations or it will stop all the address translations (not shown).

Figure 14A:
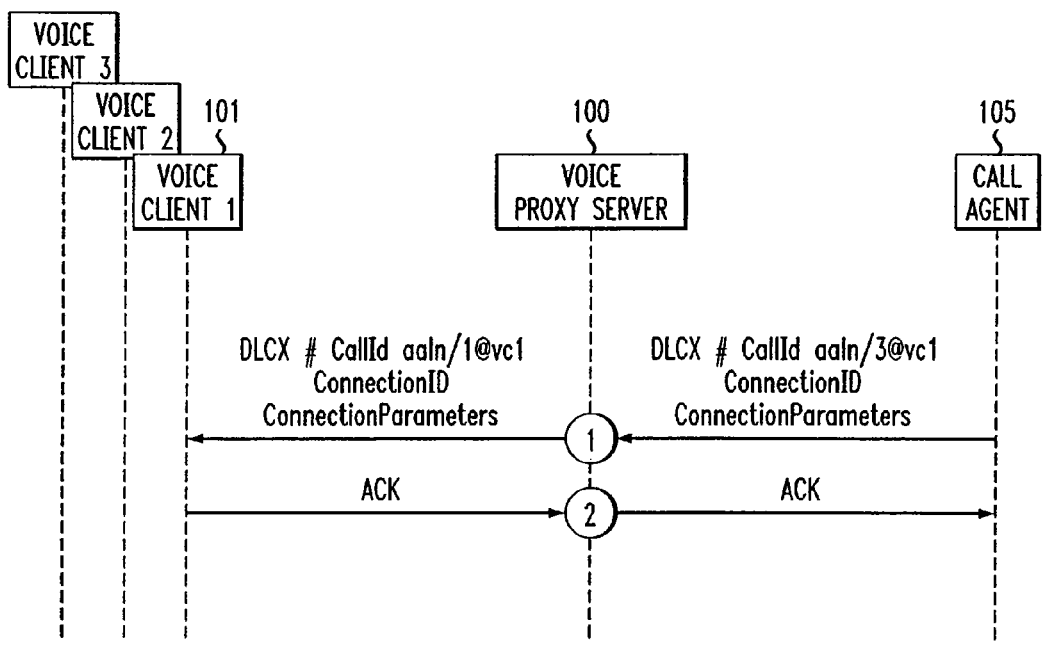
FIG. 14a illustrates an exemplary embodiment of message flow for Delete Connection (DLCX) from a voice client.
Figure 14B:
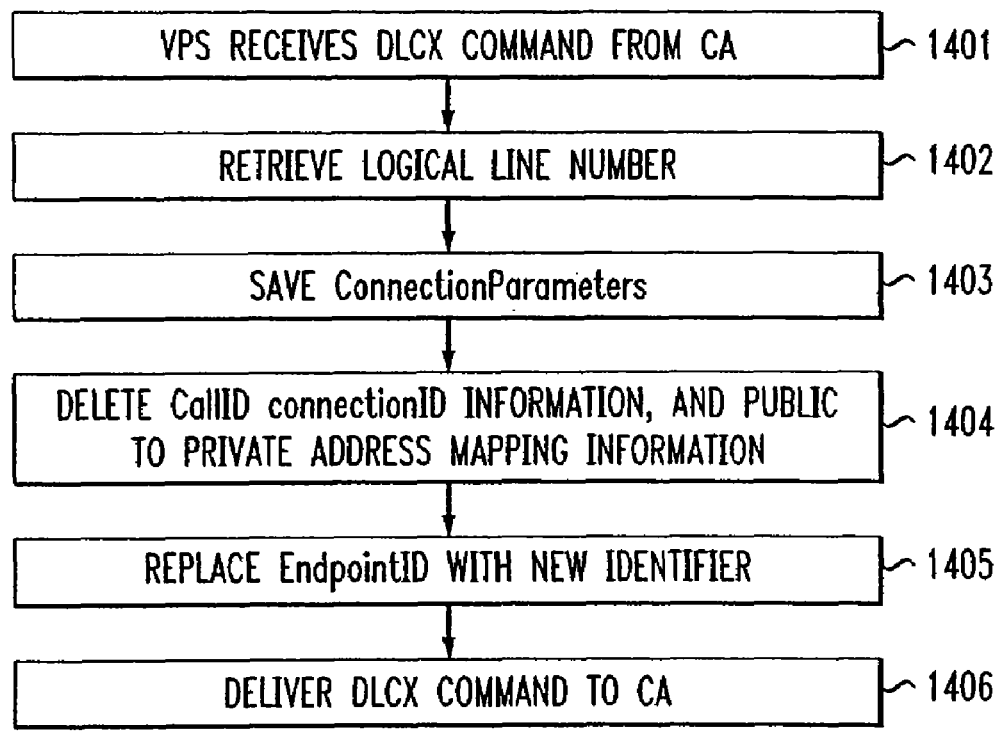
FIG. 14b is a flowchart illustrating an exemplary method of DLCX message flow.

FIG. 14a and FIG. 14b illustrate another exemplary application of the VPS 100 of the present invention. In this example, the VPS receives a Delete Connection (DLCX) (step 1401) from a local voice client. The corresponding logical line number at VPS is retrieved (step 1402). ConnectionParameters are saved for performance measurements (step 1403). The callID information, ConnectionID information, and associated public to private address mapping information are deleted (step 1404). VPS may also request the NAT to disable the address translation if necessary or it will stop the translation (not shown). EndpointID parameter is replaced with a new identifier (step 1405) and the DLCX command is delivered to the call agent (step 1406).

Figure 15A:
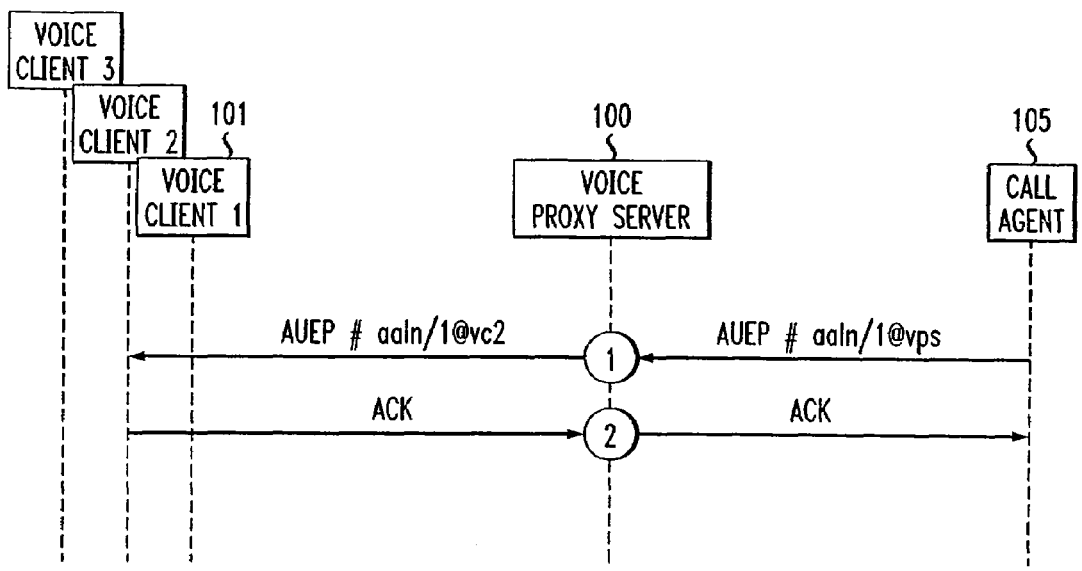
FIG. 15a illustrates an exemplary embodiment of message flow for Audit Endpoints (AUEP).
Figure 15B:
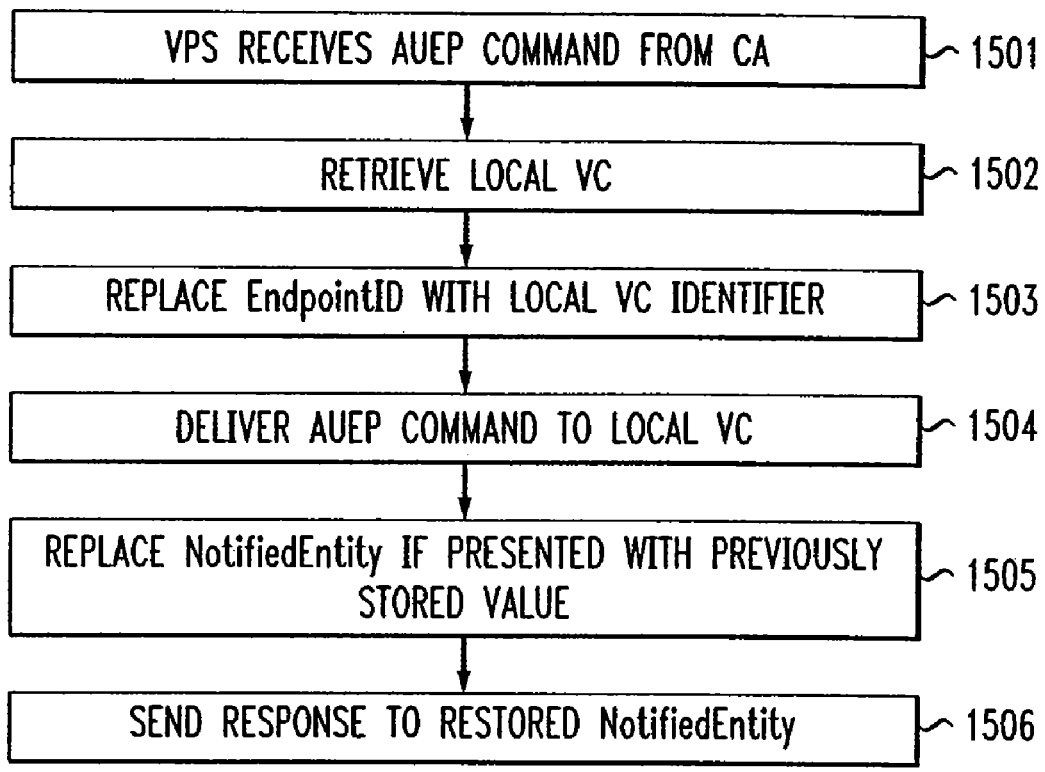
FIG. 15b is a flowchart illustrating an exemplary method of AUEP message flow.

FIG. 15a and FIG. 15b illustrate another exemplary application of the VPS 100 of the present invention. In this example, the VPS receives an Audit Endpoints command (AUEP) from a call agent (step 1501) with EndpointID specified as a single endpoint. RequestedInfo may also be specified. The VPS retrieves the local voice client from the line mapping table according to the EndpointID specified in the AUEP command (step 1502). The EndpointID parameter is replaced with the local voice client identifier (step 1503) and the AUEP command is delivered to the local voice client (step 1504). After the VPS receives a response from the voice client, the VPS replaced the NotifiedEntity if presented with a previously stored value (step 1505) and sends the response to the restored NotifiedEntity (step 1506), corresponding to the call agent 105.

Figure 16A:
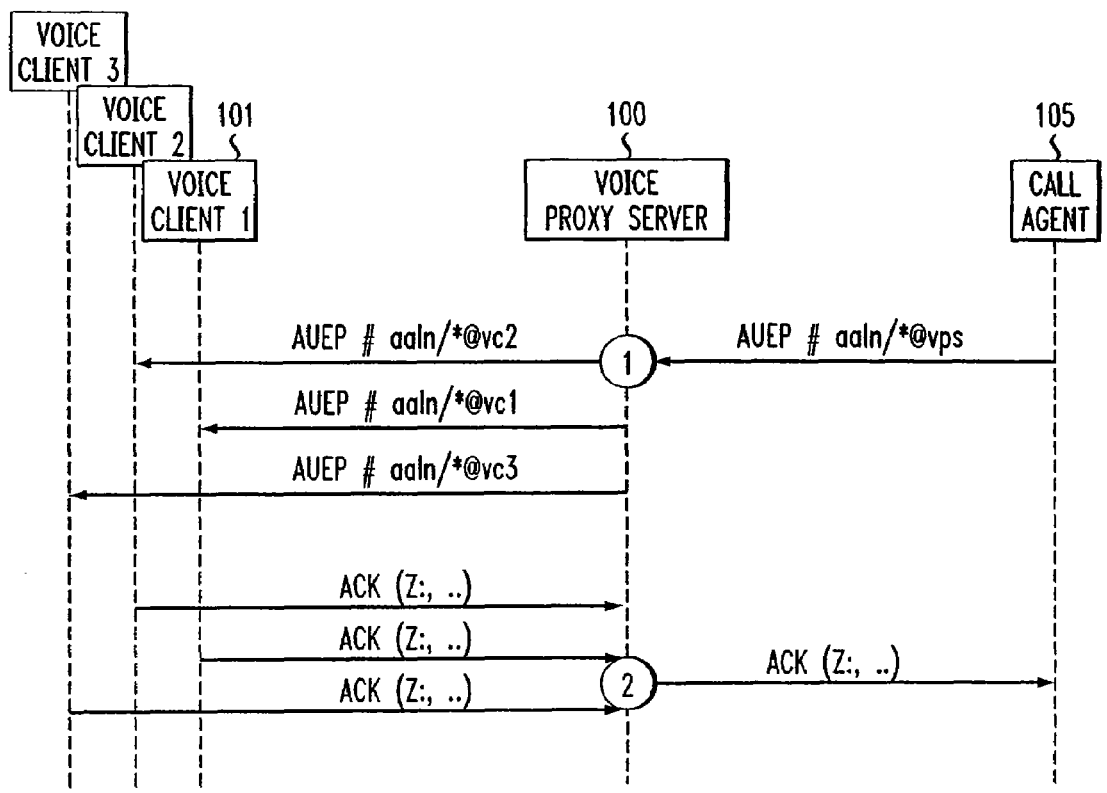
FIG. 16a illustrates an exemplary embodiment of message flow for Audit Multiple Endpoints.
Figure 16B:
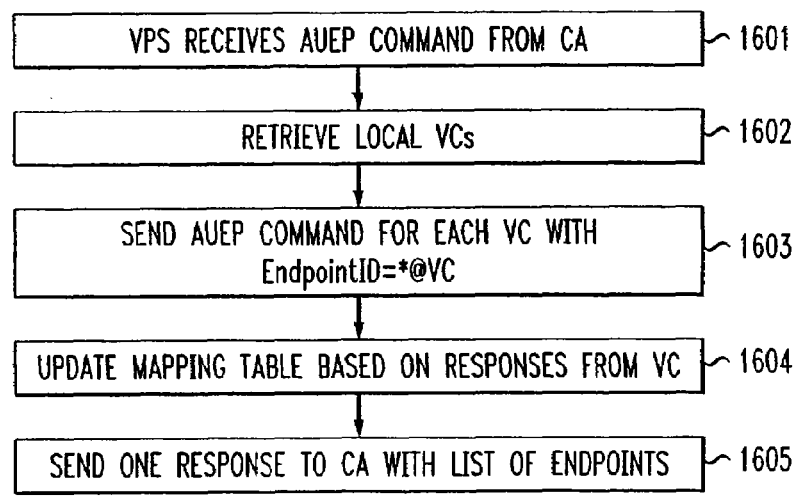
FIG. 16b is a flowchart illustrating an exemplary method of Audit Multiple Endpoints where EndpointID=*@VPS.

FIG. 16a and FIG. 16b illustrate another exemplary application of the VPS 100 of the present invention. In this example, the VPS receives an Audit Multiple Endpoints (AUEP) command with a wild card (e.g.=*@VPS). The VPS 100 retrieves all the local voice clients from the line mapping table within the VPS 100 (step 1602). The VPS 100 sends the AUEP command to each of the retrieved voice clients with the EndpointID parameter=*@vc (step 1603). Once responses are received from the voice clients, the VPS updates the line mapping table accordingly (step 1604). The VPS sends one response to the call agent when all responses from the voice clients are received including a list of endpoints (step 1605).

Figure 16C:
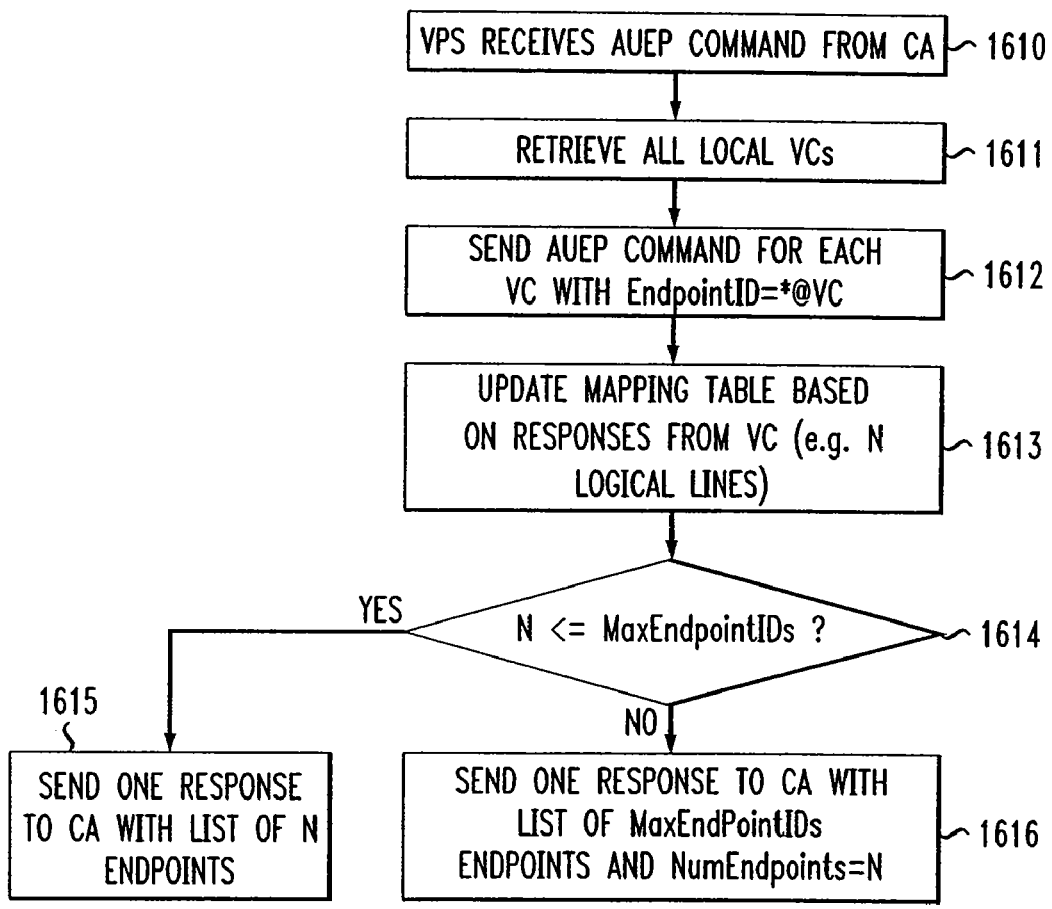
FIG. 16c is a flowchart illustrating an exemplary method of Audit Multiple Endpoints where MaxEndpointIDs are specified.

FIG. 16c illustrates another exemplary application of the VPS 100 of the present invention. In this example, the VPS receives an AUEP message from a call agent with EndpointID=*@VPS and a parameter associated with the maximum number of Endpoints such as the MaxEndPointIDs specified (step 1610). The VPS 100 retrieves all the local voice clients from the line mapping table (step 1611) and sends the AUEP command with EndpointID parameter=*@vc to each of the retrieved voice clients (step 1612). Once responses are received from the voice clients, the VPS updates the line mapping table accordingly (step 1613) and when all the responses are received, the VPS may have N logical lines corresponding to the physical lines at the voice clients (step 1614). If N is less than or equal to MaxEndPointIDs, the VPS sends one response to the call agent with a list of N endpoints (step 1615). If not, the VPS sends one response to the call agent including a list of endpoints, the number of endpoints being equal to the value of MaxEndPointIDs, along with the total number of endpoints, NumEndPoints=N (step 1616).

Figure 16D:
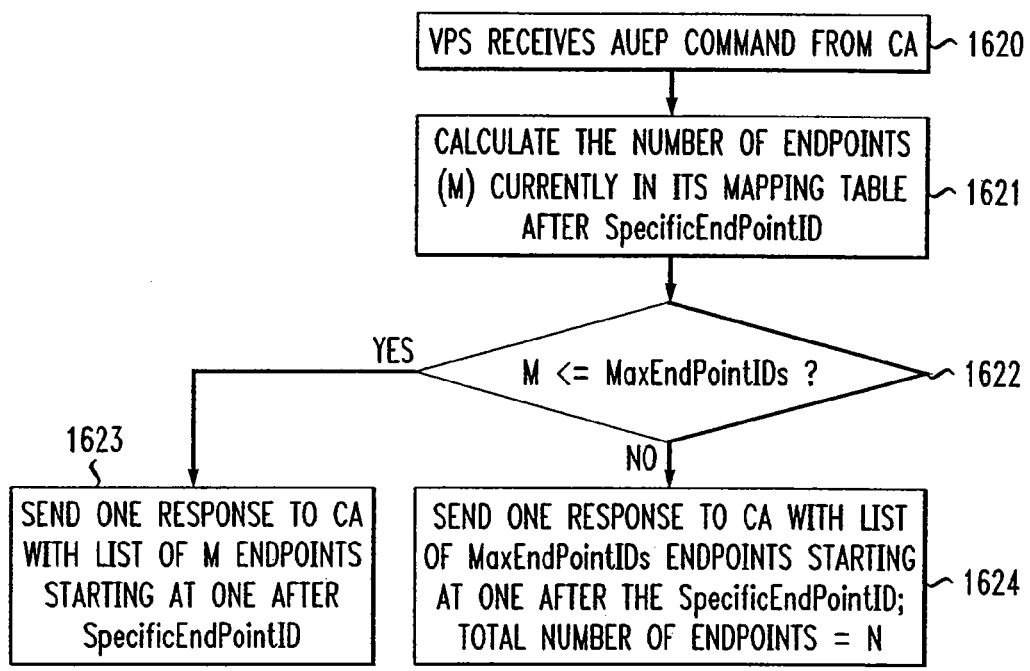
FIG. 16d is a flowchart illustrating an exemplary method of Audit Multiple Endpoints where MaxEndpointIDs and SpecificEndpointIDs are specified.

FIG. 16d illustrates another exemplary application of the VPS 100 of the present invention. In this example, the VPS receives an AUEP message from a call agent with EndpointID=*@VPS and the MaxEndPointIDs and a parameter indicating a specified endpoint identifying parameter such as the SpecificEndPointID are specified (step 1620). The VPS calculates the number of endpoints ("M") after the SpecificEndPointID (step 1621). If M is less than or equal to MaxEndPointIDs (step 1622), then the VPS sends one response to the call agent with a list of M endpoints, the first endpoint being the endpoint immediately following the SpecificEndPointID (step 1623)—i.e., the remaining list of endpoints. If M is greater than MaxEndPointIDs, then the VPS sends one response to the call agent with a list of endpoints, the list containing a number of endpoints equal to the value of MaxEndPointIDs and the first endpoint being the endpoint immediately following the SpecificEndPointID (step 1624)—i.e., the next block of endpoints. In this case, the VPS may also send the number of the total number of endpoints, N, as NumEndPoints.

Figure 16E:
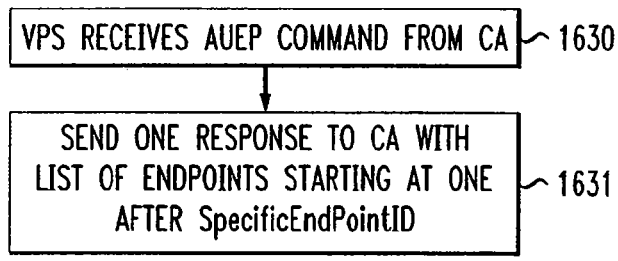
FIG. 16e is a flowchart illustrating an exemplary method of Audit Multiple Endpoints where SpecificEndpointIDs are specified.

FIG. 16e illustrates another exemplary application of the VPS 100 of the present invention. In this example, the VPS receives an AUEP message from a call agent with EndpointID=*@VPS and the SpecificEndPointID is specified (step 1630). The VPS sends one response to the call agent with a list of endpoints (step 1631). The list of endpoints starts at a first endpoint, the first endpoint being the endpoint immediately after the SpecificEndPointID. In this way, the VPS sends the remaining list of endpoints.

Figure 17A:
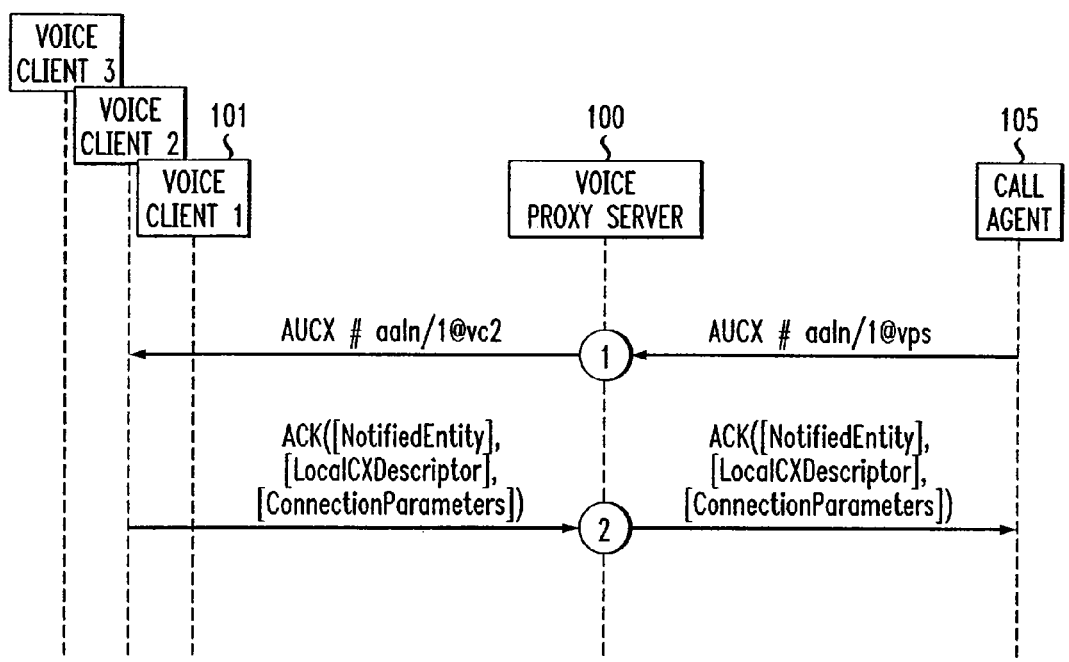
FIG. 17a illustrates an exemplary embodiment of message flow for Audit Connection (AUCX).
Figure 17B:
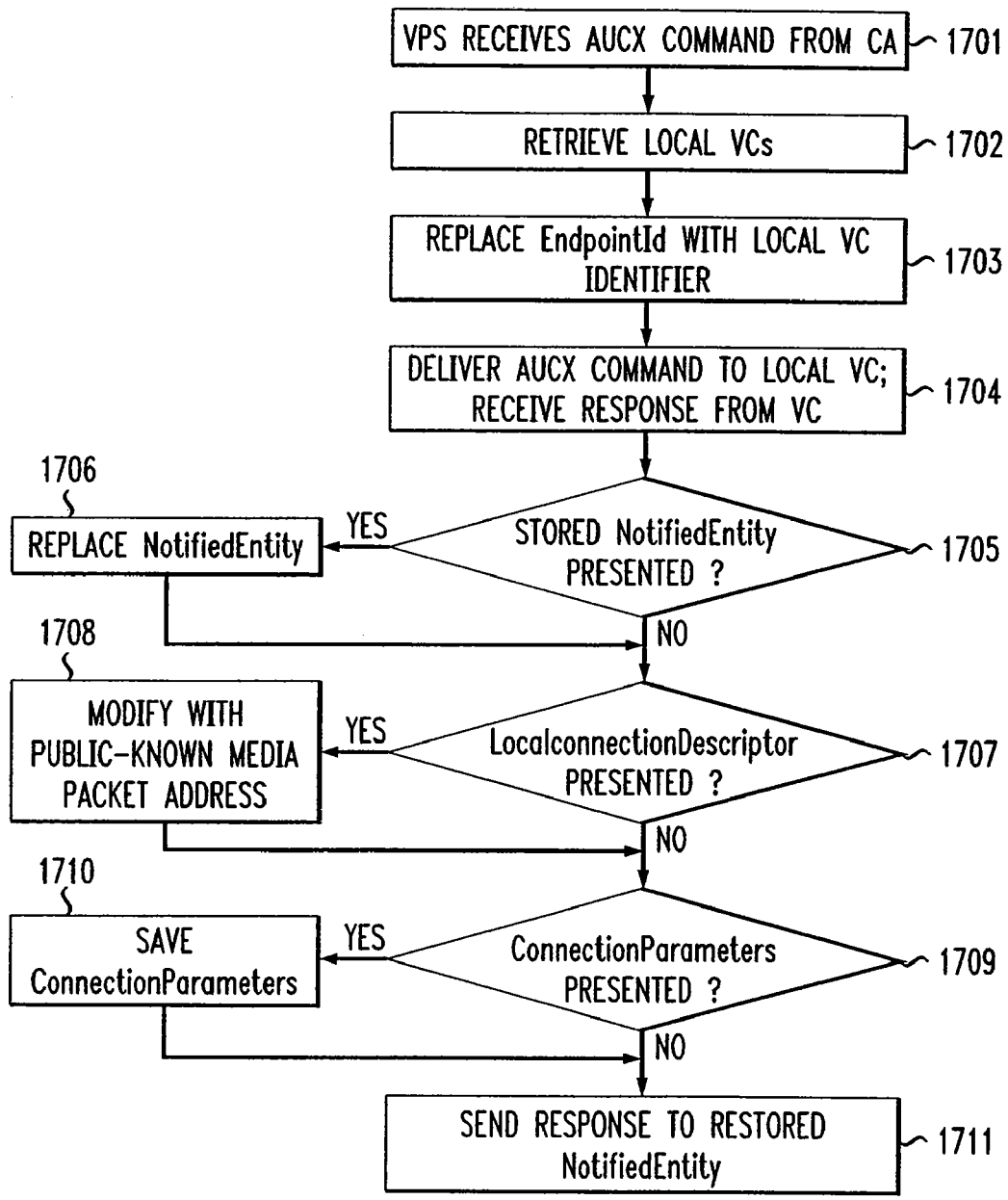
FIG. 17b is a flowchart illustrating an exemplary method of AUCX message flow where EndpointID is a single endpoint.

FIG. 17a and FIG. 17b illustrate another exemplary application of the VPS 100 of the present invention. In this example, the VPS receives an Audit Connection command (AUCX) from a calling agent (step 1701) with EndpointID specified as a single endpoint. The voice client is retrieved from the line mapping table of the VPS according to the EndpointID specified in the AUCX command (step 1702). The EndpointID parameter is replaced with the local voice client identifier (step 1703) and the AUCX command is delivered to the local voice client (step 1704). When the VPS receives a response from the voice client, the VPS replaces the NotifiedEntity if presented with the previously stored value (step 1705, 1706), modifies the LocalConnectionDescriptor if presented to have the corresponding public-known media packet receiving IP address and port number (step 1707, 1708), saves the ConnectionParameters if presented for performance measurements (step 1709, 1710) and sends the response to the restored NotifiedEntity (step 1711), which corresponds to the call agent 105.

It is understood that the present invention can take many forms and embodiments. The embodiments shown herein are intended to illustrate rather than to limit the invention, it being appreciated that variations may be made without departing from the spirit of the scope of the invention.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for managing network services between a plurality of networks comprising:
    receiving at a Voice Proxy Server (VPS) an Internet Protocol data packet with a corresponding source address from a first network, wherein the Internet Protocol data packet comprises a header and a payload and the payload of said Internet Protocol data packet contains at least a portion of a destination address;
    translating the destination address, wherein the translating comprises:
        receiving a first endpoint identifying parameter corresponding to a private network node;
        checking a mapping table for the first endpoint identifying parameter;
        allocating a logical line number to create a VPS endpoint identifying parameter based on said checking, wherein the VPS endpoint identifying parameter comprises the logical line number and VPS IP address;
        saving a mapping of the first endpoint identifying parameter and the VPS endpoint identifying parameter in the mapping table; and
        replacing the first endpoint identifying parameter with the VPS endpoint identifying parameter; and
    delivering the Internet Protocol data packet to a destination node on a second network based on said translating.

2. The method of claim 1, wherein the Internet Protocol data packet carries Voice-over-IP (VoIP) protocol messages.

3. The method of claim 2, wherein the VoIP protocol is one of Media Gateway Controller Protocol (MGCP)/Network-based Call signaling (NCS) protocol and Session Initiation Protocol (SIP).

4. The method of claim 3, wherein the VoIP protocol is MGCP/NCS.

5. The method of claim 4, wherein the VoIP protocol provides call control.

6. The method of claim 1, wherein the first network is a public network and the second network is a private network, said private network comprising a plurality of local nodes.

7. The method of claim 1, wherein the first network is a private network comprising a plurality of local nodes and the second network is a public network.

8. The method of claim 1, wherein said translating further comprises:
    receiving a first parameter corresponding to a Call Agent of a public network;
    saving the first parameter corresponding to the Call Agent; and
    replacing the first parameter corresponding to the Call Agent with a second parameter, the second parameter corresponding to the VPS.

9. The method of claim 1, wherein the first endpoint identifying parameter represents a group of endpoints and the translating further comprises:
    querying the number of endpoints associated with the private network node.

10. The method of claim 1, wherein said translating further comprises sending a NACK response based on said checking.

11. The method of claim 1, wherein the first endpoint identifying parameter comprises a VPS endpoint.

12. The method of claim 11, wherein said translating further comprises:
    receiving a first parameter corresponding to a Call Agent of a public network;
    saving the first parameter corresponding to the Call Agent; and replacing the first parameter corresponding to the call Agent with a second parameter, the second parameter corresponding to the VPS.

13. The method of claim 11, further comprising:
receiving a Transaction Identifier from a private network node; and
retrieving a corresponding endpoint from the mapping table based on the Transaction Identifier.

14. The method of claim 13, further comprising modifying the mapping information.

15. The method of claim 1, wherein the first endpoint identifying parameter comprises a wild card representing one of a plurality of endpoints.

16. The method of claim 15, wherein the first parameter indicating a notified entity corresponding to the VPS.

17. The method of claim 15, further comprising:
receiving a Transaction Identifier from a private network node; and
retrieving a corresponding endpoint from the mapping table based on the Transaction Identifier.

18. The method of claim 1, wherein said delivering comprises sending modified signaling messages from private network nodes to a Call Agent in a public network.

19. The method of claim 1, wherein said delivering comprises sending modified signaling messages from a Call Agent in a public network to a desired private network node wherein the IP address of the private network node is retrieved from the mapping table.

* * * * *